United States Patent
Mori

[11] Patent Number: 6,081,384
[45] Date of Patent: Jun. 27, 2000

[54] COLOR-CORRECTED AND TEMPERATURE-COMPENSATED LENS HAVING AN ANOMALOUS DISPERSION GLASS LENS

[75] Inventor: Masao Mori, Omiya, Japan

[73] Assignee: Fuji Photo Optical Co., Ltd., Saitama, Japan

[21] Appl. No.: 08/943,216

[22] Filed: Oct. 6, 1997

[30] Foreign Application Priority Data

Oct. 30, 1996 [JP] Japan .................................. 8-306008

[51] Int. Cl.$^7$ .............................. G02B 27/14; G02B 3/00
[52] U.S. Cl. ........................................... 359/637; 359/649
[58] Field of Search ................................... 359/637, 649, 359/714, 745; 501/903

[56] References Cited

U.S. PATENT DOCUMENTS

| 4,545,654 | 10/1985 | Sato ....................................... 359/745 |
| 5,452,132 | 9/1995 | Kim ....................................... 359/649 |

OTHER PUBLICATIONS

Jap.Unexamined Pat.Pub.No. 4–298709, Oct. 22, 1992, Japan and English language Abstract "Infrared Ray Optical Device".
Jap.Unexamined Pat.Pub.No. 5–34591, Feb. 12, 1993, Japan and English language Abstract "Image Forming Lens for Compensating Temperature Variation".
Jap.Unexamined Pat.Pub.No. 6–34882, Feb. 10, 1994, Japan and English language Abstract "Zoom Lens".
Jap.Unexamined Pat.Pub.No. 6–130267, May 13, 1994, Japan and English language Abstract "Temperature Compensated Optical Device".
Jap.Unexamined Pat.Pub.No. 6–186466, Jul. 8, 1994, Japan and English language Abstract,, Photographing Device Having Temperature Compensation, Jul. 8, 1994.
Jap.Unexamined Pat.Pub.No. 6–265782, Sep. 22, 1994, Japan and English language Abstract, "Projecting Lens Device".

*Primary Examiner*—Georgia Epps
*Assistant Examiner*—Ricky Mack
*Attorney, Agent, or Firm*—Snider & Chao, LLP; Ronald R. Snider

[57] ABSTRACT

A lens system is constituted by a cemented lens made of anomalous dispersion glass for correcting the secondary spectrum of axial chromatic aberration, and a plastic lens having a temperature-compensating characteristic for compensating for defocusing upon change of the lens system with respect to temperature, thereby satisfactorily correcting color and compensating for temperature at the same time in a simple configuration. The imaging lens for image readout is constituted by eight sheets of lenses $L_1$ to $L_8$, in which the fourth lens $L_4$ and the fifth lens $L_5$ form a cemented lens made of anomalous dispersion glass, whereas the first lens $L_1$ is a substantially powerless plastic lens having a temperature-compensating characteristic for compensating for defocusing upon change in the lens system with respect to temperature.

2 Claims, 24 Drawing Sheets

EXAMPLE 1

EXAMPLE 2

EXAMPLE 3

EXAMPLE 4

EXAMPLE 5

EXAMPLE 6

EXAMPLE 7

EXAMPLE 8

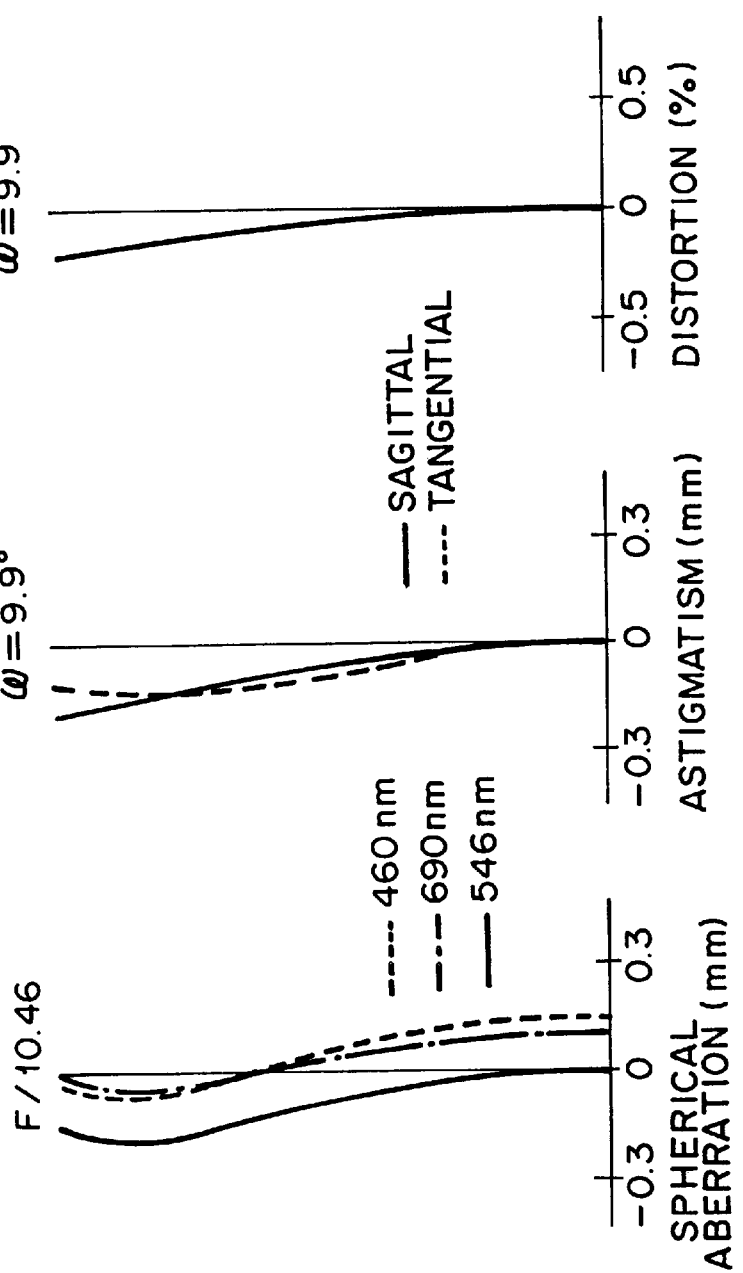
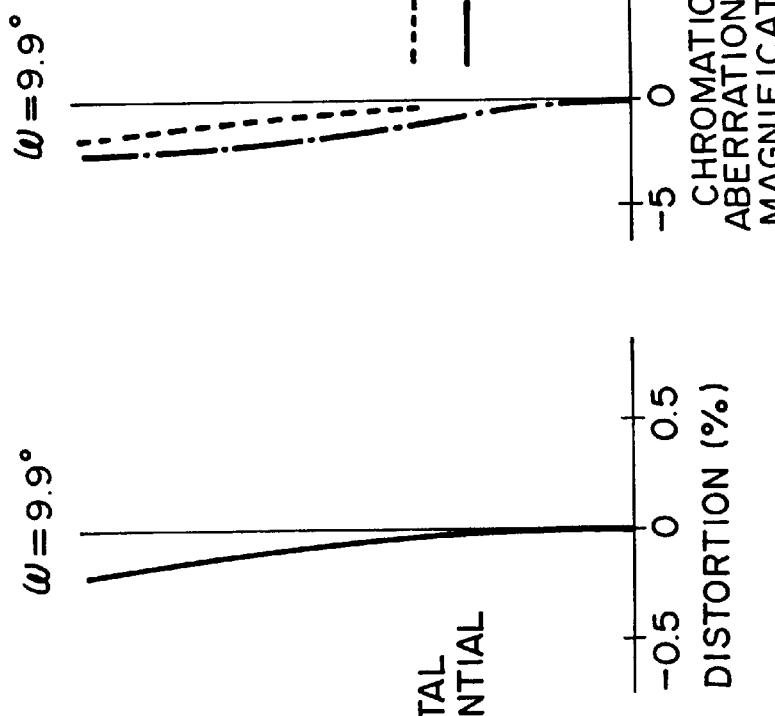
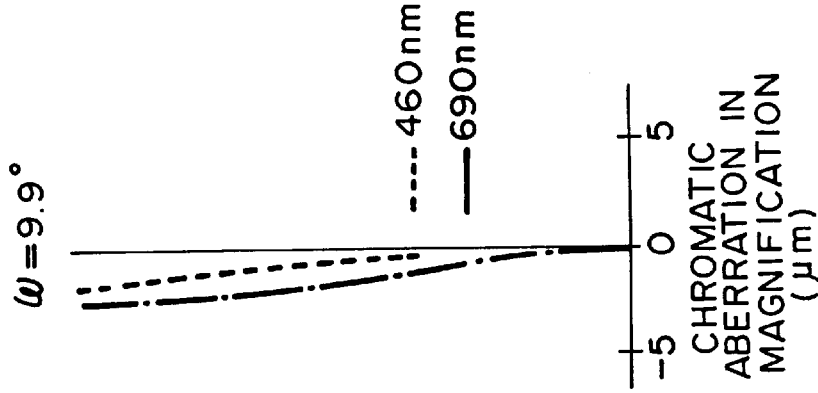
FIG. 9A EXAMPLE 1
FIG. 9B EXAMPLE 1
FIG. 9C EXAMPLE 1
FIG. 9D EXAMPLE 1

EXAMPLE 1

EXAMPLE 1

EXAMPLE 1

EXAMPLE 1

EXAMPLE 1

EXAMPLE 1

EXAMPLE 1

COMA

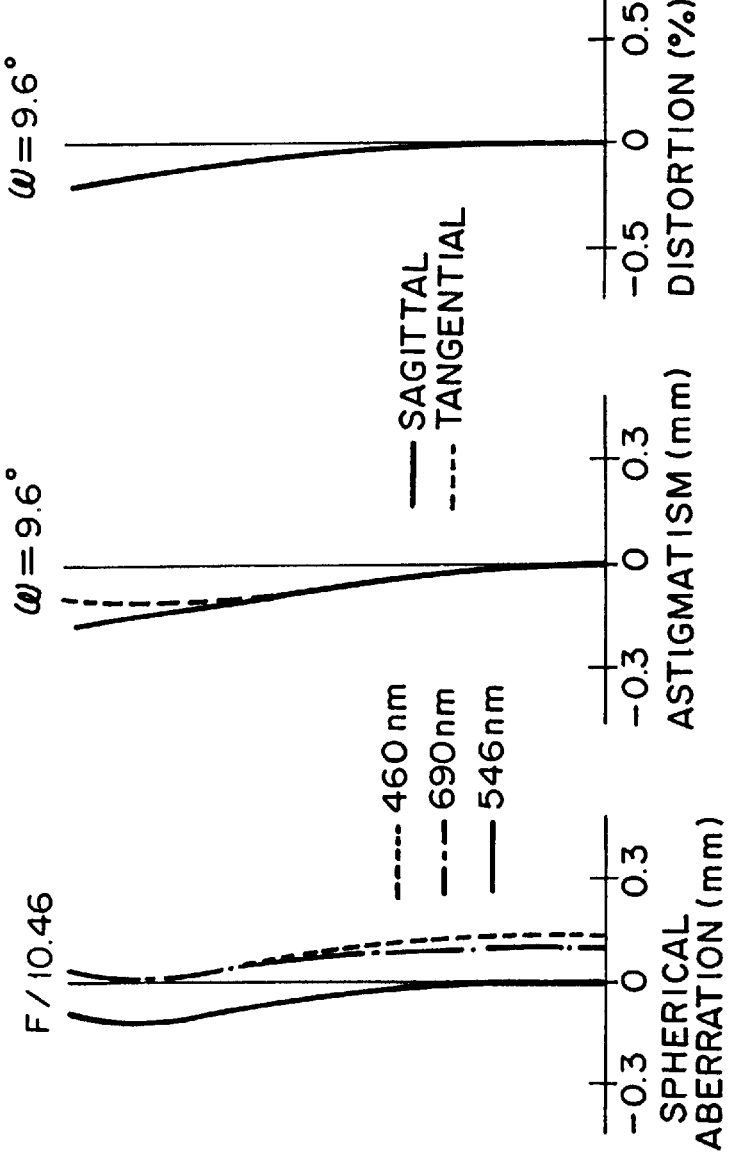

EXAMPLE 2

EXAMPLE 2

EXAMPLE 2

EXAMPLE 2

EXAMPLE 2

EXAMPLE 2

COMA

EXAMPLE 2

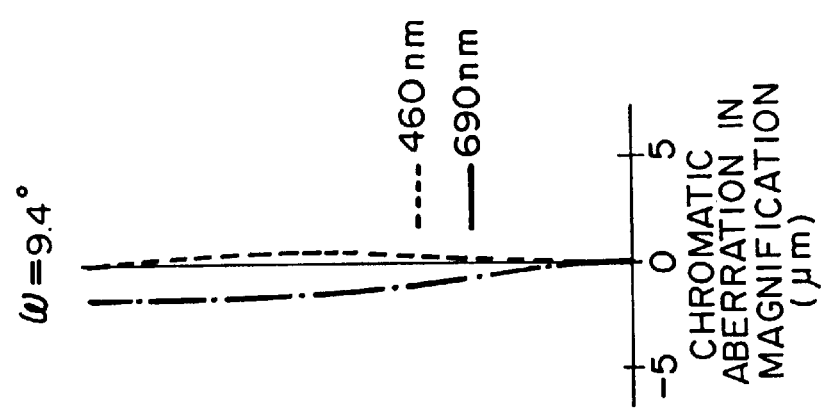
FIG.13D EXAMPLE 3
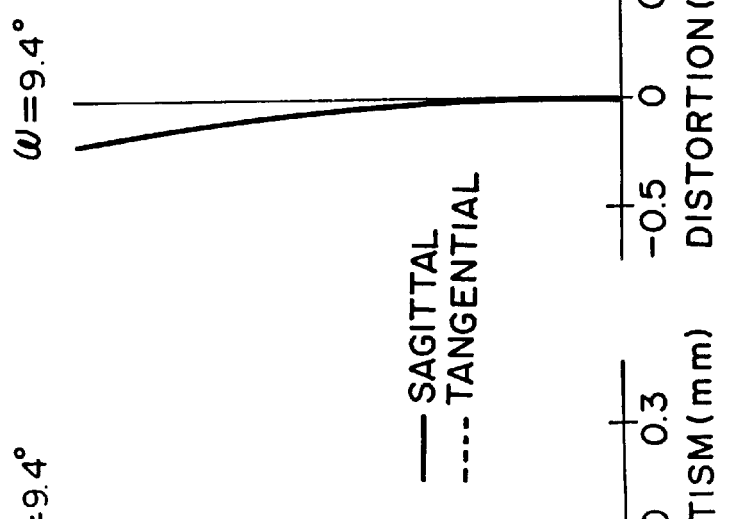
FIG.13C EXAMPLE 3
FIG.13B EXAMPLE 3
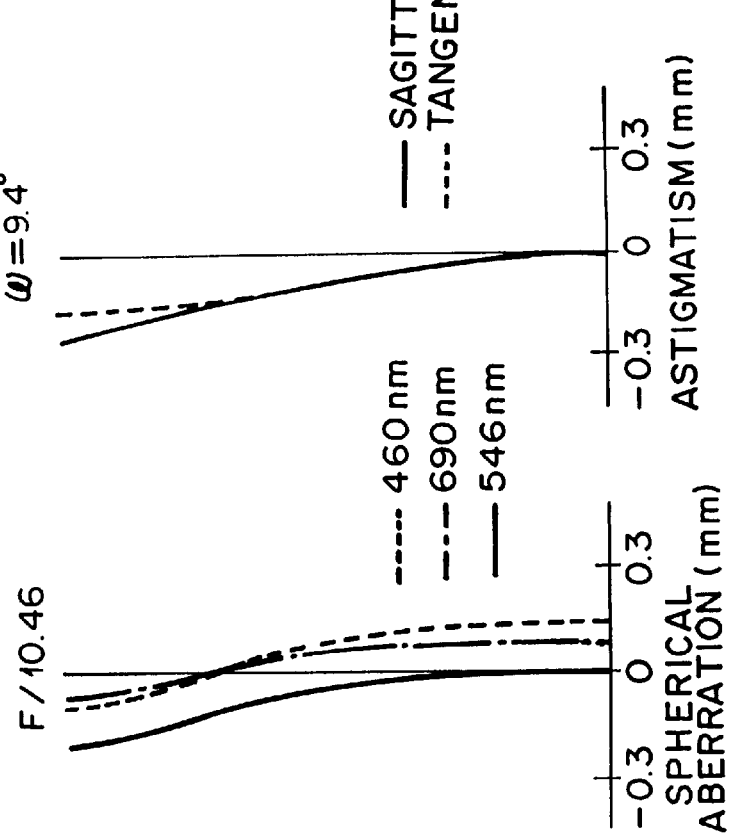
FIG.13A EXAMPLE 3

EXAMPLE 3

EXAMPLE 3

EXAMPLE 3

EXAMPLE 3

EXAMPLE 3

EXAMPLE 3

EXAMPLE 3

COMA

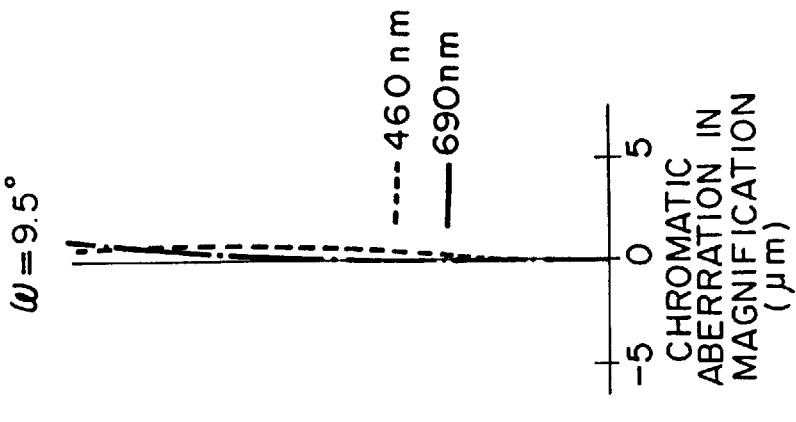
FIG.15A EXAMPLE 4
FIG.15B EXAMPLE 4
FIG.15C EXAMPLE 4
FIG.15D EXAMPLE 4

EXAMPLE 4

EXAMPLE 4

EXAMPLE 4

EXAMPLE 4

EXAMPLE 4

EXAMPLE 4

COMA

EXAMPLE 4

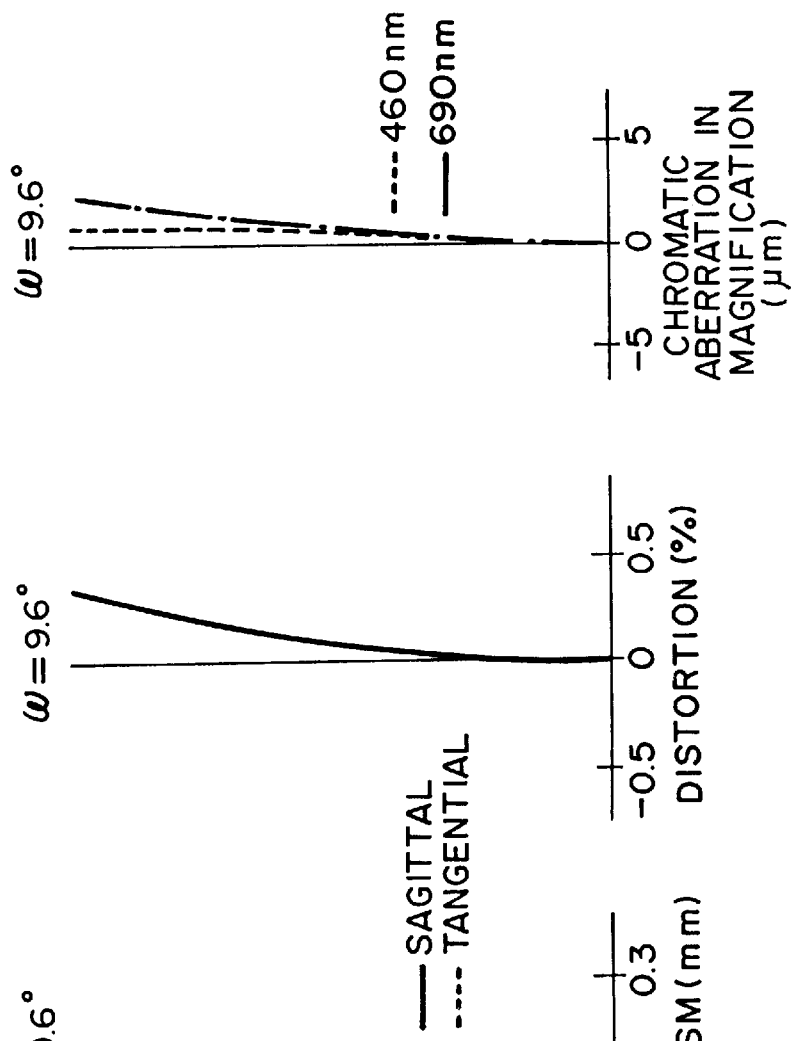
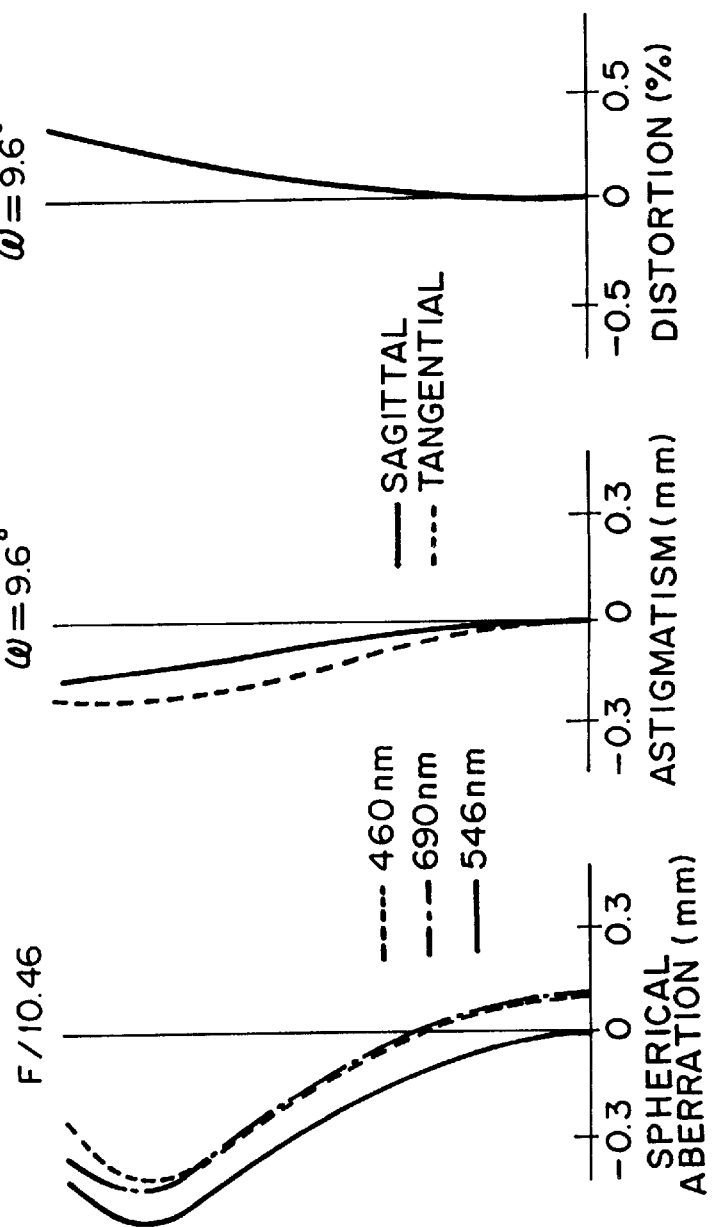
FIG.17A EXAMPLE 5
FIG.17B EXAMPLE 5
FIG.17C EXAMPLE 5
FIG.17D EXAMPLE 5

EXAMPLE 5

EXAMPLE 5

EXAMPLE 5

EXAMPLE 5

EXAMPLE 5

EXAMPLE 5

COMA

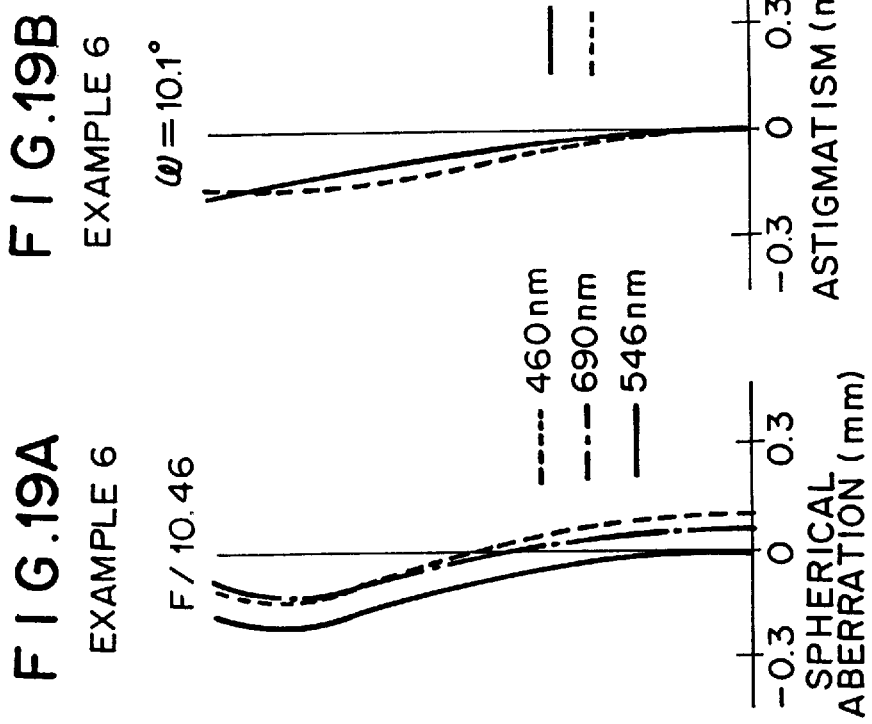

EXAMPLE 6

EXAMPLE 6

EXAMPLE 6

EXAMPLE 6

EXAMPLE 6

EXAMPLE 6

COMA

EXAMPLE 6

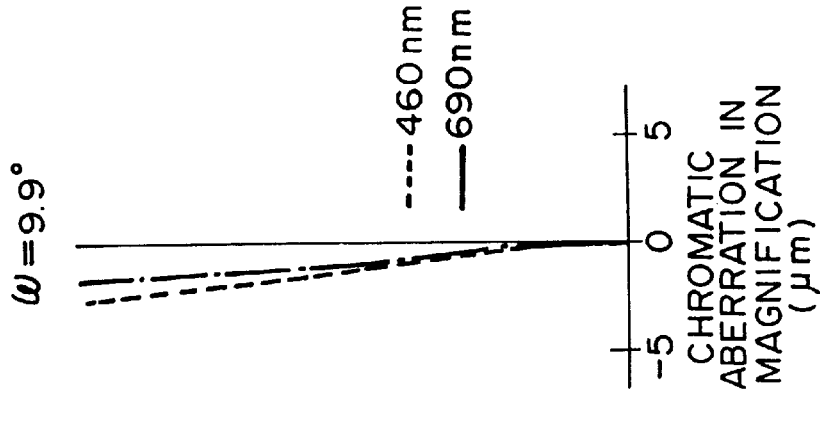
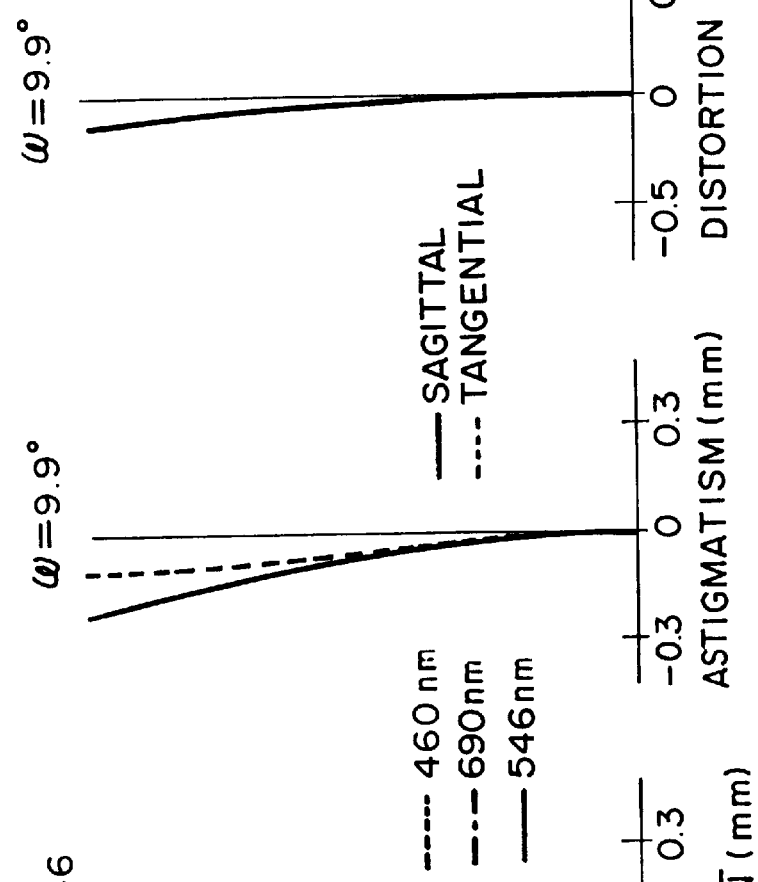
FIG. 21A EXAMPLE 7
FIG. 21B EXAMPLE 7
FIG. 21C EXAMPLE 7
FIG. 21D EXAMPLE 7

EXAMPLE 7

EXAMPLE 7

EXAMPLE 7

EXAMPLE 7

EXAMPLE 7

EXAMPLE 7

COMA

EXAMPLE 7

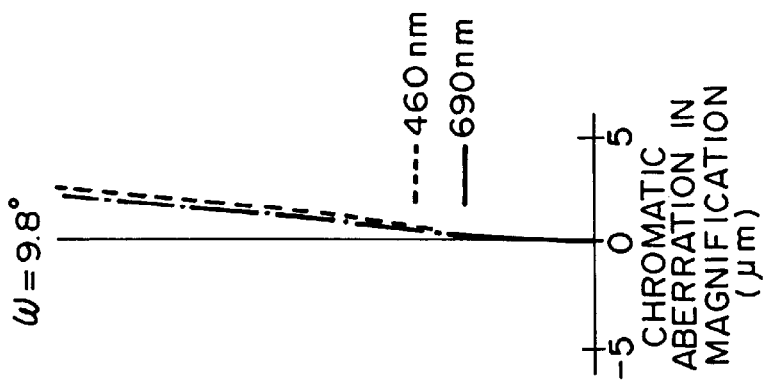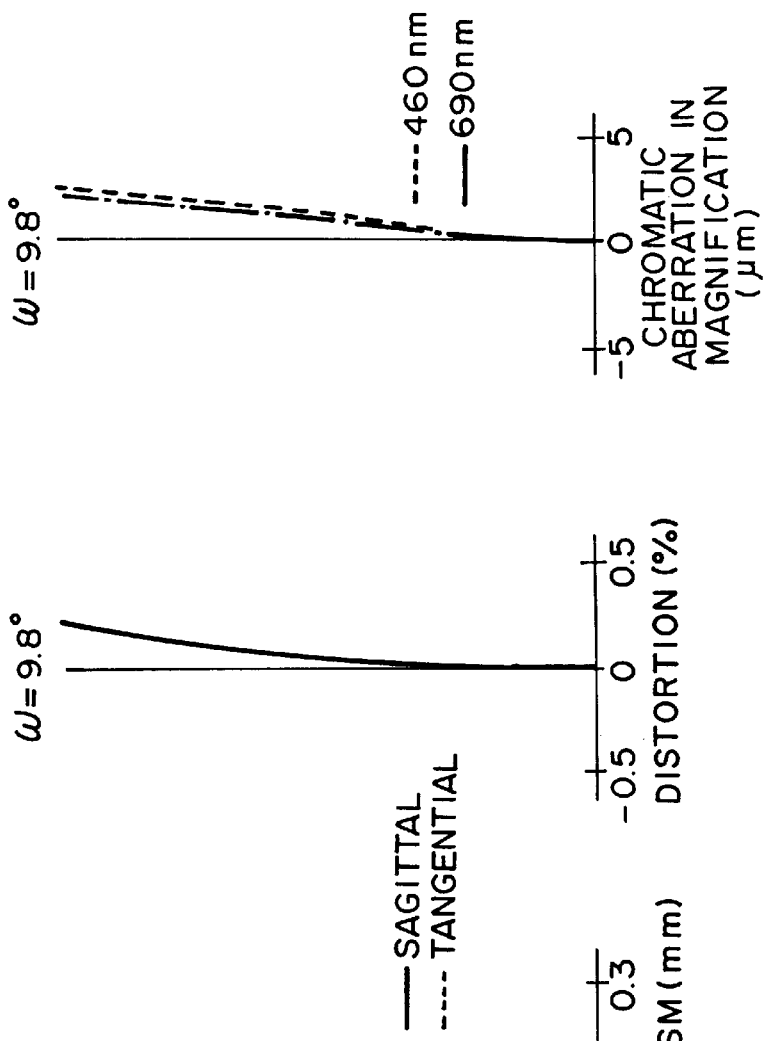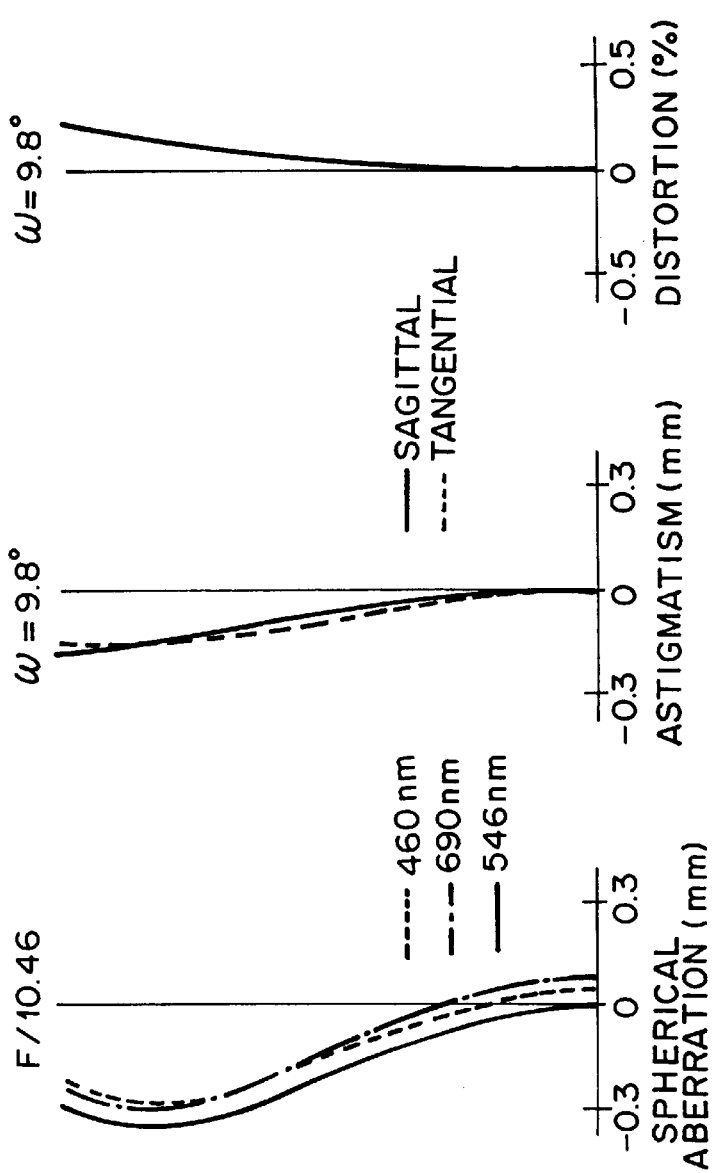

EXAMPLE 8

EXAMPLE 8

EXAMPLE 8

EXAMPLE 8

EXAMPLE 8

EXAMPLE 8

COMA

EXAMPLE 8

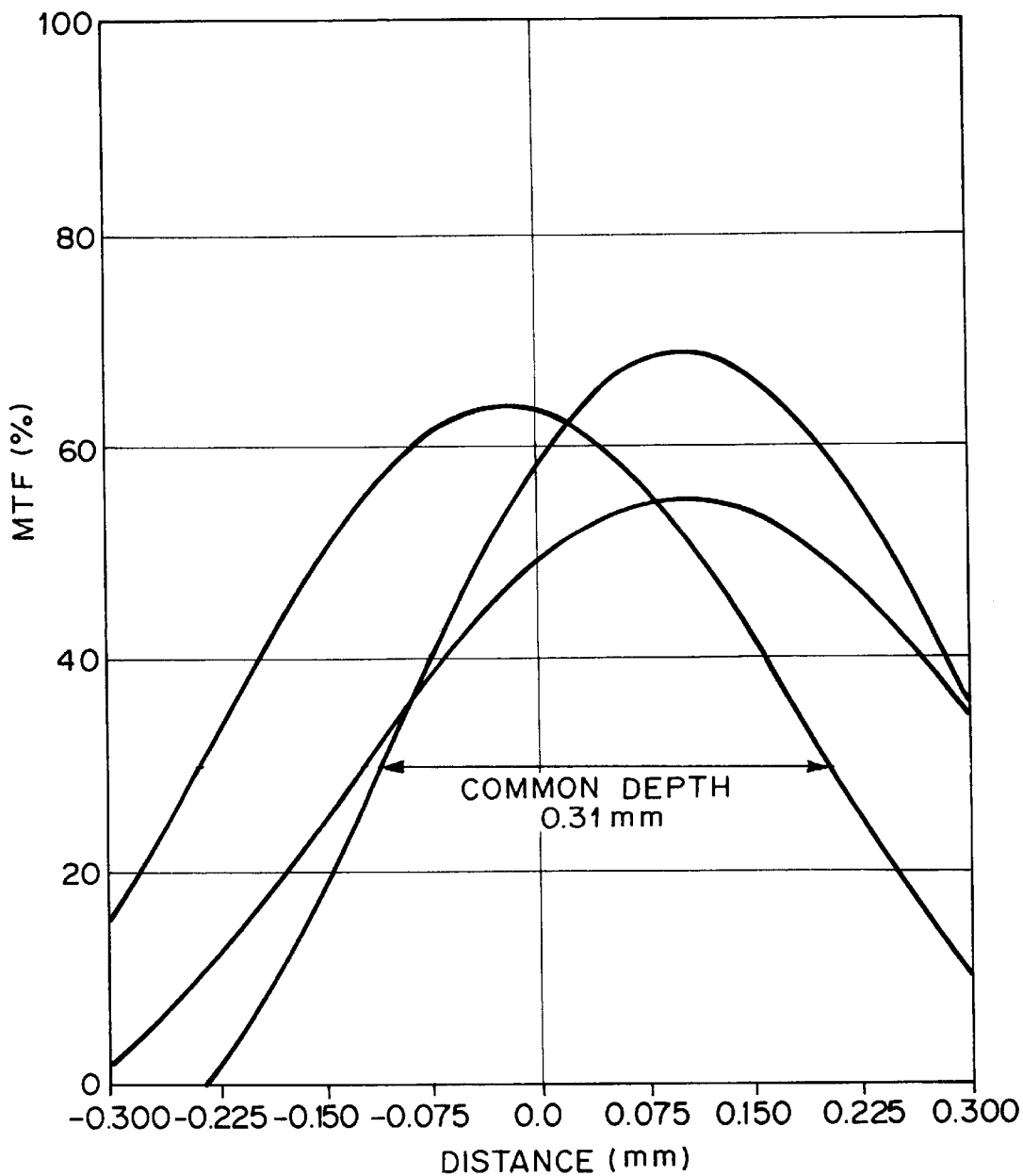

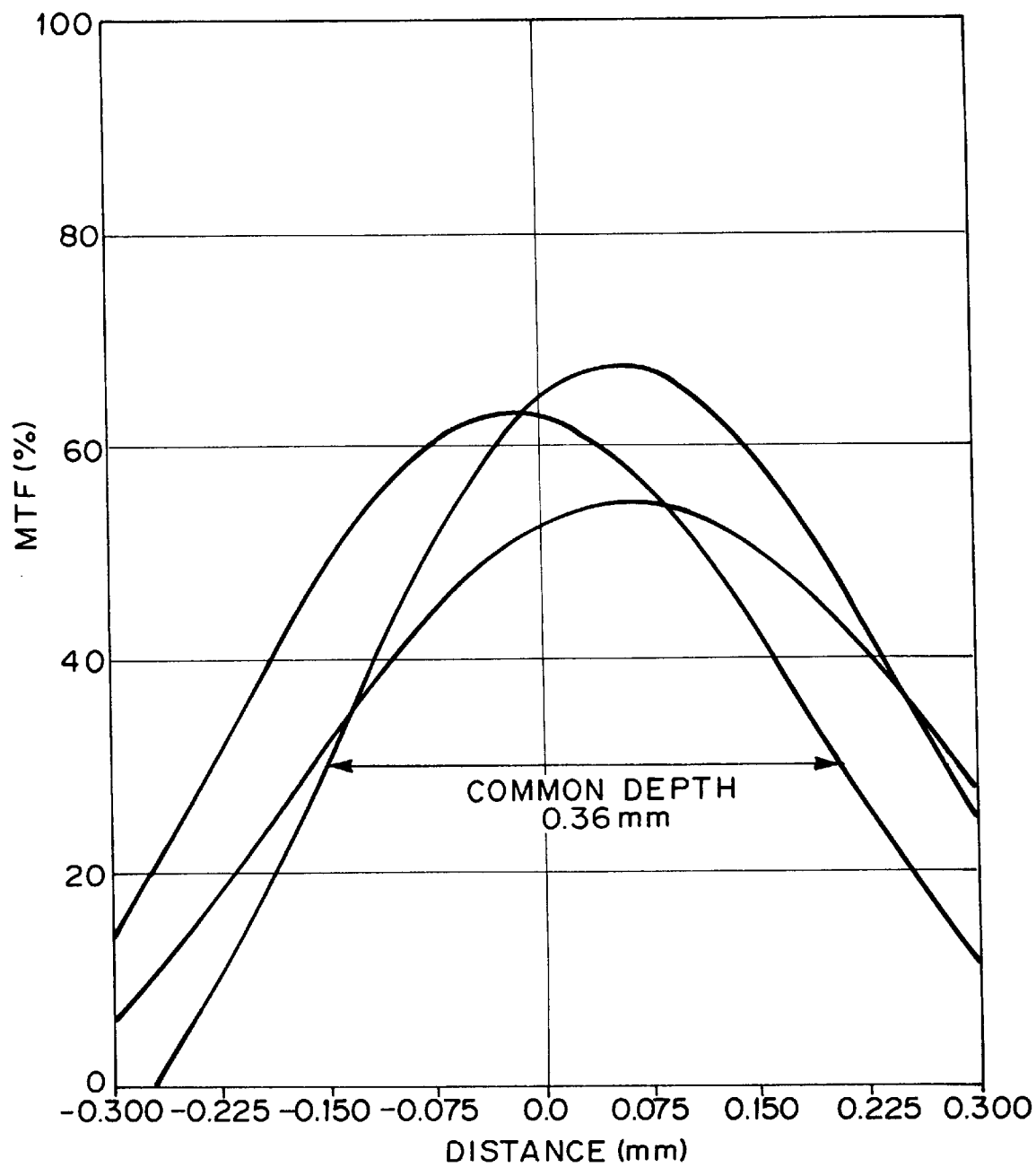

EXAMPLE 8

CONVENTIONAL EXAMPLE (PRIOR ART)

COLOR-CORRECTED AND TEMPERATURE-COMPENSATED LENS HAVING AN ANOMALOUS DISPERSION GLASS LENS

RELATED APPLICATIONS

This application claims the priority of Japanese Patent Application No. 8-306008 filed on Oct. 30, 1996, which is incorporated herein by reference.

BACKGROUND OF THE INVENTION

1. Field of the Invention

The present invention relates to a color-corrected and temperature-compensated lens which can correct chromatic aberration and compensate for defocusing upon temperature at the same time and, in particular, to an image readout lens used for reading out an original with a color image or the like.

2. Description of the Prior Art

There has been widely known in general that secondary spectra of chromatic aberration can effectively be corrected by means of a lens made of a material having an anomalous dispersion characteristic.

For example, a readout lens with a seven-sheet configuration such as that shown in FIG. 28 in which a concave lens $L_3$ and a convex lens $L_4$, which are respectively the third and fourth lenses from the object side, are cemented together to form an achromatic lens can attain a relatively large common depth of 0.37 mm, for example, with respect to three color light components of R, G, and B, thus allowing the secondary spectrum of chromatic aberration to be effectively corrected.

On the other hand, materials with an anomalous dispersion characteristic typically have a large coefficient of linear expansion $\alpha$, and its change in refractive index with respect to change in temperature, $dn/dt$, is a large negative value.

Accordingly, a coefficient $\chi$ concerning temperature inherent in glass represented by the following equation:

$$\chi = \alpha - dn/dt[1/(n-1)]$$

becomes a large value.

Since the amount of movement of focus upon change in temperature depends on the refracting power $\phi$ and the temperature coefficient $\chi$, the amount of focus movement with respect to change in temperature increases as the temperature coefficient $\chi$ is greater.

As the prior art for correcting the movement of focus with respect to change in temperature, it has been known to combine lens-forming materials under a certain condition so as to suppress the amount of focus movement to a certain extent as disclosed in Japanese Unexamined Patent Publication No. 4-298709.

This prior art, however, does not take much account of the correction of chromatic aberration and, in particular, does not consider any correction of the secondary spectrum of chromatic aberration.

SUMMARY OF THE INVENTION

In view of these circumstances, it is an object of the present invention to provide a color-corrected and temperature-compensated lens which can satisfactorily effect color correction and temperature compensation at the same time in a simple configuration.

The color-corrected and temperature-compensated lens in accordance with the present invention comprises a lens system composed of a plurality of lenses including a lens made of anomalous dispersion glass for correcting a secondary spectrum of axial chromatic aberration and a plastic lens having a temperature-compensating characteristic for compensating for defocusing upon change of the lens system with respect to temperature.

Preferably, the lens in accordance with the present invention satisfies the following conditional expressions (1) to (3):

$$-1.2 < \Sigma_i \Phi_i h_i \chi_i < 3.0 \tag{1}$$

$$|(\Sigma_i \Phi_i h_i \chi_i)g / (\Sigma_j \Phi_j h_j \chi_j)p| < 1.3 \tag{2}$$

$$-1.5 < (\Sigma_i \Phi_i h_i \chi_i)ed / (\Sigma_j \Phi_j h_j \chi_j)p < -0.7 \tag{3}$$

wherein $\Phi_i$ is a refracting power of the lens;

$h_i$ is a height of a ray passing through each lens when each lens is substituted by a thin lens and subjected to ray tracing with respect to its center luminous flux;

$\chi_i$ is a coefficient determined by:

$$\chi = \alpha - dn/dt[1/(n-1)]$$

where a coefficient of linear expansion of a material is $\alpha$, a refractive index thereof is $N$, and change in refractive index thereof with respect to change in temperature is $dn/dt$; and suffixes g, p, and ed respectively refer to a glass lens, a plastic lens, and an anomalous dispersion lens having a level of dispersion $\nu=60$ or higher and a temperature coefficient $\chi=9.0$ or higher.

Preferably, the lens in accordance with the present invention further satisfies the following conditional expression (4):

$$|(\Sigma_i \Phi_i y_i)p| < 0.11 \tag{4}$$

wherein $y_i$ is a maximum value among heights at which all of rays passing through the lens system are transmitted through the plastic lens.

BRIEF DESCRIPTION OF THE DRAWINGS

FIG. 9A, 9B, 9C, and 9D are aberration charts (showing spherical aberration, astigmatism, distortion, and chromatic aberration in magnification) of the lens in accordance with Example 1;

FIG. 11A, 11B, 11C, and 11D are aberration charts (showing spherical aberration, astigmatism, distortion, and chromatic aberration in magnification) of the lens in accordance with Example 2;

FIG. 13A, 13B, 13C, and 13D are aberration charts (showing spherical aberration, astigmatism, distortion, and chromatic aberration in magnification) of the lens in accordance with Example 3;

FIG. 15A, 15B, 15C, and 15D are aberration charts (showing spherical aberration, astigmatism, distortion, and chromatic aberration in magnification) of the lens in accordance with Example 4;

FIG. 17A, 17B, 17C, and 17D are aberration charts (showing spherical aberration, astigmatism, distortion, and chromatic aberration in magnification) of the lens in accordance with Example 5;

FIG. 19A, 19B, 19C, and 19D are aberration charts (showing spherical aberration, astigmatism, distortion, and chromatic aberration in magnification) of the lens in accordance with Example 6;

FIG. 21A, 21B, 21C, and 21D are aberration charts (showing spherical aberration, astigmatism, distortion, and chromatic aberration in magnification) of the lens in accordance with Example 7;

FIG. 23A, 23B, 23C, and 23D are aberration charts (showing spherical aberration, astigmatism, distortion, and chromatic aberration in magnification) of the lens in accordance with Example 8;

FIG. 25 is a graph showing a common depth with respect to three color light components of R, G, and B in Example 2;

FIG. 26 is a graph showing a common depth with respect to three color light components of R, G, and B in Example 6;

DETAILED DESCRIPTION OF THE PREFERRED EMBODIMENTS

In the following, embodiments of the present invention will be explained with reference to the accompanying drawings.

Example 1

Figure 1:
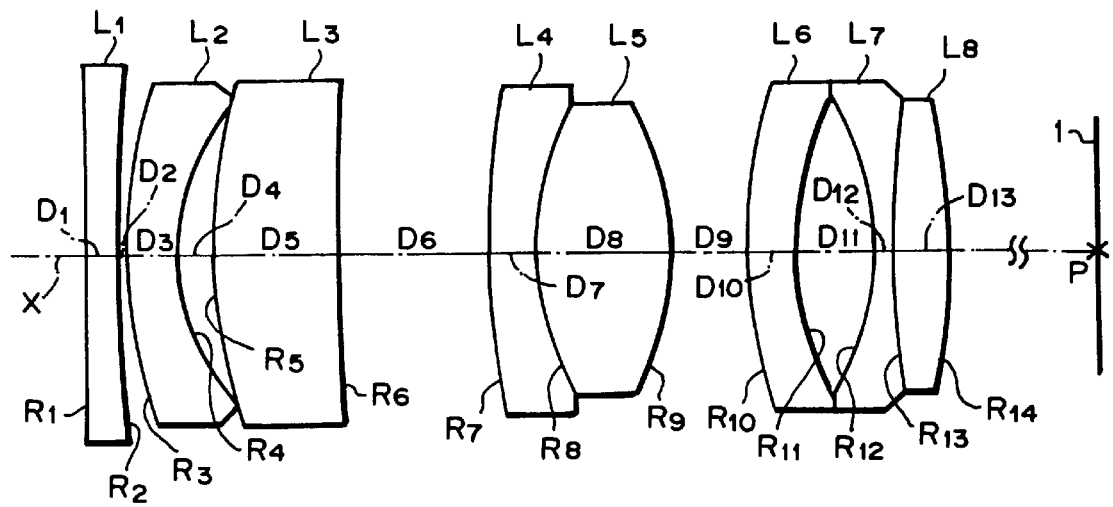
FIG. 1 is a schematic view showing a basic lens configuration in accordance with Example 1 of the present invention.

FIG. 1 shows a basic lens configuration of Example 1. As depicted, an imaging lens for image readout (hereinafter referred as imaging lens) having color-correcting and temperature-compensating functions in accordance with Example 1 is constituted by eight sheets of lenses $L_1$ to $L_8$ in six groups in which the fourth lens L4 and the fifth lens $L_5$ are cemented together, the seventh lens $L_7$ and the eighth lens $L_8$ are cemented together, and a luminous flux incident thereon from the object side along an optical axis X forms an image at an imaging position P on an imaging surface 1.

Here, the first lens $L_1$ is a plastic lens substantially having no power, the second lens $L_2$ is a negative meniscus lens having a convex surface directed onto the object side, the third lens $L_3$ is a positive meniscus lens having a convex surface directed onto the object side, the fourth lens $L_4$ is a negative meniscus lens having a convex surface directed onto the object side, the fifth lens $L_5$ is a biconvex lens having two surfaces with the same curvature, the sixth lens $L_6$ is a negative meniscus lens having a convex surface directed onto the object side, the seventh lens $L_7$ is a biconcave lens having a surface with a stronger curvature directed onto the object side, and the eighth lens $L_8$ is a biconvex lens having a surface with a stronger curvature directed onto the imaging side.

In the imaging lens in accordance with Example 1, the concave fourth lens $L_4$ and the convex fifth lens $L_5$, which are made of anomalous dispersion glass, constitute a cemented lens so as to exhibit an achromatic function. In the case where such anomalous dispersion glass is used to sufficiently correct the secondary spectrum of chromatic aberration, its focus moves due to change in temperature when a product $\phi\chi$ of its refracting power $\phi$ and a temperature coefficient $\chi$ determined by the coefficient of linear expansion of its material, its change in refractive index upon temperature, or the like is large. In a lens in which the secondary spectrum is sufficiently corrected, the amount of focus movement is too large to neglect with respect to a tolerable range of performance deterioration caused by errors. In the case where it remarkably deteriorates desired performances, a temperature sensor may be provided so that the amount of deviation from a reference is corrected on the basis of the value observed thereby, or a mechanism for adjusting the focus by moving the lens may become necessary, thus complicating the temperature-compensating operation.

Also, conventional methods of preventing the focus from moving due to change in temperature in which plastic lenses and the like are combined together under a specific condition are restricted in terms of design, thus lowering the degree of freedom in designing.

Accordingly, in Example 1, a powerless plastic lens is used as the first lens $L_1$, so as to compensate for the focus movement upon change in temperature caused by the anomalous dispersion glass or the like.

Namely, this example employs a combination of anomalous dispersion glass and a plastic lens, so as to be able to correct the secondary spectrum of chromatic aberration and compensate for defocusing upon change in temperature at the same time. Thus, it utilizes the fact that plastics have a large absolute value of temperature coefficient such as change in refractive index with respect to temperature or coefficient of linear expansion, and introduces into its system a plastic lens having a refracting power which can cancel the amount of focus movement caused by the anomalous dispersion glass with respect to change in temperature, thereby nullifying the defocusing of the whole system.

Consequently, a sufficiently color-corrected and temperature-compensated lens can easily be obtained without restricting the degree of freedom in terms of design.

Also, this example is configured so as to satisfy the following four conditional expressions:

$$-1.2 < \Sigma_i \Phi_i h_i \chi_i < 3.0 \quad (1)$$

$$|(\Sigma_i \Phi_i h_i \chi_i)g / (\Sigma_j \Phi_j h_j \chi_j)p| < 1.3 \quad (2)$$

$$-1.5 < (\Sigma_i \Phi_i h_i \chi_i)ed / (\Sigma_j \Phi_j h_j \chi_j)p < -0.7 \quad (3)$$

$$|(\Sigma_i \Phi_i y_i)p| < 0.11 \quad (4)$$

wherein $\Phi_i$ is a refracting power of each lens;

$h_i$ is a height of a ray passing through each lens when each lens is substituted by a thin lens and subjected to ray tracing with respect to its center luminous flux;

$\chi_i$ is a coefficient determined by:

$$\chi = \alpha - dn/dt[1/(n-1)]$$

where a coefficient of linear expansion of a material is $\alpha$, a refractive index thereof is N, and change in refractive index thereof with respect to change in temperature is dn/dt;

$y_i$ is a maximum value among heights at which all of rays passing through the lens system are transmitted through a plastic lens; and suffixes g, p, and ed respectively refer to a glass lens, a plastic lens, and an anomalous dispersion lens having a level of dispersion $\nu=60$ or higher and a temperature coefficient $\chi=9.0$ or higher.

In the following, these four conditional expressions will be explained.

The above expression (1) is an expression indicating a balance between the color correction and the focus movement correction upon change in temperature. Below its lower limit, the refracting power of the correction lens may be so strong that it becomes difficult to sufficiently correct axial chromatic aberration and chromatic aberration in magnification. In the outermost luminous flux, in particular, color shifting in coma may become so large that performances deteriorate. Beyond the upper limit, by contrast, the secondary color correction may become so much that there is a greater focus movement upon change in temperature. Namely, the refracting power of the correction lens may become so strong that problems similar to those mentioned above occur, thereby deteriorating the balance between the chromatic aberration correction and the focus movement compensation.

The above expression (2) is an expression concerning the focus movement correction. Beyond its upper limit, the amount of focus movement may be so large that sufficient performances cannot be maintained upon change in temperature.

The above expression (3) is an expression concerning a characteristic balance between the anomalous dispersion glass lens and the plastic lens. Below its lower limit, the secondary color correction may have an inferior balance or the amount of correction for focus movement may become insufficient, whereby sufficient performances cannot be maintained. Beyond the upper limit, by contrast, the amount of focus correction may become so much that sufficient performances cannot be maintained.

The above expression (4) is an expression concerning the refracting power of the plastic lens. Beyond its upper limit, the refracting power of the plastic lens may become too strong or the effective diameter thereof may become too large. Consequently, it becomes difficult to correct chromatic aberration and other kinds of aberration such as coma, thereby deteriorating performances.

Table 1 (follows) shows the radius of curvature R (mm) of each lens surface, the center thickness of each lens or air gap between adjacent lenses D (mm), the refractive index N of each lens at d-line, the Abbe number $\nu$ of each lens, and the temperature coefficient $\chi$ of each lens in Example 1.

In Table 1, as well as in Tables 3, 5, 7, 9, 11, 13, 15, and 18 which will be explained later, numbers denoting the marks R, D, N, and $\nu$ successively increase from the object side.

Also, the upper part of Table 2 (follows) indicates values of focal length f, effective F number, half angle of view $\omega$, and lateral magnification m of the whole lens system in the imaging lens in Example 1.

Further, the lower part of Table 2 indicates values respectively corresponding to expressions (1) to (4) in Example 1.

As can be seen from Table 2, all of conditional expressions (1) to (4) are satisfied in this example.

Example 2

Figure 2:
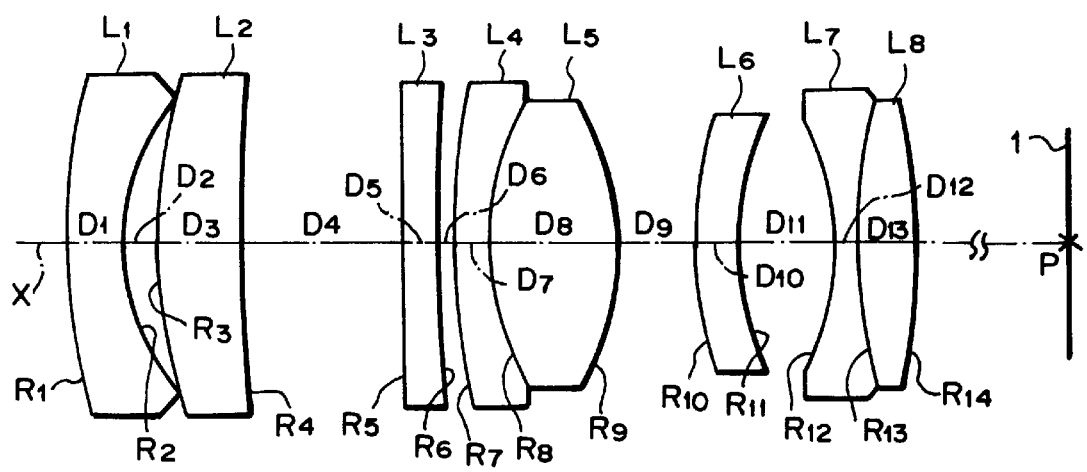
FIG. 2 is a schematic view showing a basic lens configuration in accordance with Example 2 of the present invention.

FIG. 2 shows a basic lens configuration of Example 2. Though the lens configuration in this example is substantially the same as that in Example 1, they are different from each other in that, while the first lens $L_1$ from the object side is a powerless plastic lens in Example 1, the third lens $L_3$ from the object side is a powerless plastic lens in Example 2.

Table 3 (follows) shows the radius of curvature R (mm) of each lens surface, the center thickness of each lens or air gap between adjacent lenses D (mm), the refractive index N of each lens at d-line, the Abbe number $\nu$ of each lens, and the temperature coefficient $\chi$ of each lens in Example 2.

Also, the upper part of Table 4 (follows) indicates values of focal length f, effective F number, half angle of view $\omega$, and lateral magnification m of the whole lens system in the imaging lens in Example 2.

Further, the lower part of Table 4 indicates values respectively corresponding to expressions (1) to (4) in Example 2.

As can be seen from Table 4, all of conditional expressions (1) to (4) are satisfied in this example.

Example 3

Figure 3:
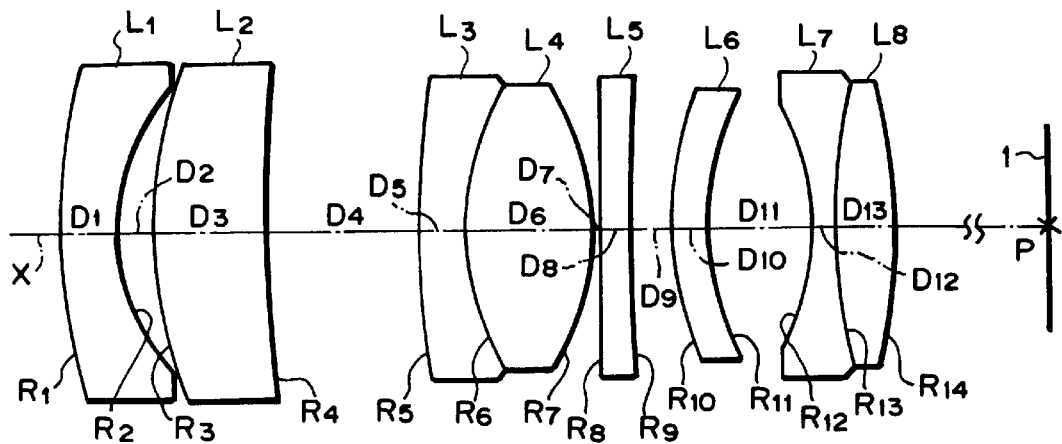
FIG. 3 is a schematic view showing a basic lens configuration in accordance with Example 3 of the present invention.

FIG. 3 shows a basic lens configuration of Example 2. Though the lens configuration in this example is substantially the same as that in Example 1, they are different from each other in that, while the first lens $L_1$ from the object side is a powerless plastic lens in Example 1, the fifth lens $L_5$ from the object side is a powerless plastic lens in Example 3.

Table 5 (follows) shows the radius of curvature R (mm) of each lens surface, the center thickness of each lens or air gap between adjacent lenses D (mm), the refractive index N of each lens at d-line, the Abbe number $\nu$ of each lens, and the temperature coefficient $\chi$ of each lens in Example 3.

Also, the upper part of Table 6 indicates values of focal length f, effective F number, half angle of view $\omega$, and lateral magnification m of the whole lens system in the imaging lens in Example 3.

Further, the lower part of Table 6 (follows) indicates values respectively corresponding to expressions (1) to (4) in Example 3.

As can be seen from Table 6, all of conditional expressions (1) to (4) are satisfied in this example.

Example 4

Figure 4:
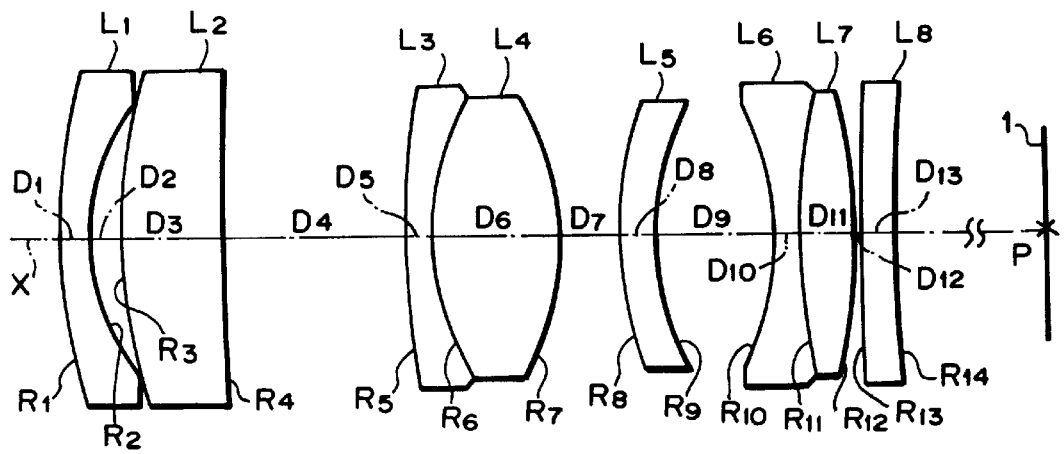
FIG. 4 is a schematic view showing a basic lens configuration in accordance with Example 4 of the present invention.

FIG. 4 shows a basic lens configuration of Example 4. Though the lens configuration in this example is substantially the same as that in Example 1, they are different from each other in that, while the first lens $L_1$ from the object side is a powerless plastic lens in Example 1, the eighth lens $L_8$ from the object side is a powerless plastic lens in Example 4.

Table 7 (follows) shows the radius of curvature R (mm) of each lens surface, the center thickness of each lens or air gap between adjacent lenses D (mm), the refractive index N of each lens at d-line, the Abbe number ν of each lens, and the temperature coefficient χ of each lens in Example 4.

Also, the upper part of Table 8 (follows) indicates values of focal length f, effective F number, half angle of view ω, and lateral magnification m of the whole lens system in the imaging lens in Example 4.

Further, the lower part of Table 8 indicates values respectively corresponding to expressions (1) to (4) in Example 4.

As can be seen from Table 8, all of conditional expressions (1) to (4) are satisfied in this example.

Example 5

Figure 5:
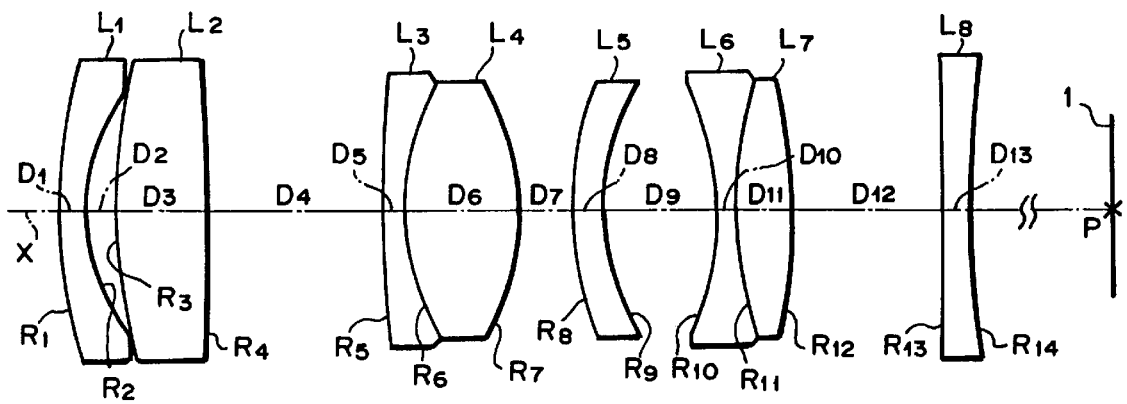
FIG. 5 is a schematic view showing a basic lens configuration in accordance with Example 5 of the present invention.

FIG. 5 shows a basic lens configuration of Example 5. Though the lens configuration in this example is substantially the same as that in Example 1, they are different from each other in that, while the first lens $L_1$ from the object side is a powerless plastic lens in Example 1, the eighth lens $L_8$ from the object side is a plastic lens having a slightly negative power in Example 5.

Table 9 (follows) shows the radius of curvature R (mm) of each lens surface, the center thickness of each lens or air gap between adjacent lenses D (mm), the refractive index N of each lens at d-line, the Abbe number ν of each lens, and the temperature coefficient χ of each lens in Example 5.

Also, the upper part of Table 10 (follows) indicates values of focal length f, effective F number, half angle of view ω, and lateral magnification m of the whole lens system in the imaging lens in Example 5.

Further, the lower part of Table 10 indicates values respectively corresponding to expressions (1) to (4) in Example 5.

As can be seen from Table 10, all of conditional expressions (1) to (4) are satisfied in this example.

Example 6

Figure 6:
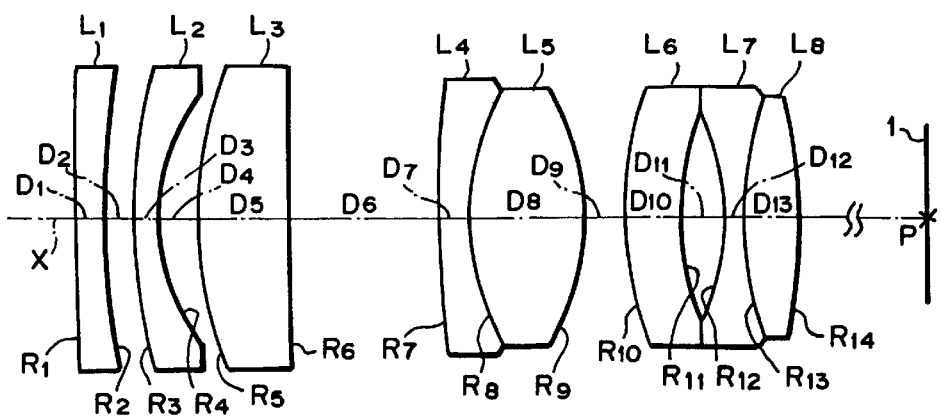
FIG. 6 is a schematic view showing a basic lens configuration in accordance with Example 6 of the present invention.

FIG. 6 shows a basic lens configuration of Example 6. Though the lens configuration in this example is substantially the same as that in Example 1, they are different from each other in that, while the first lens $L_1$ from the object side is a powerless plastic lens in Example 1, the first lens $L_1$ from the object side is a plastic lens having a slightly negative power in Example 6.

Table 11 (follows) shows the radius of curvature R (mm) of each lens surface, the center thickness of each lens or air gap between adjacent lenses D (mm), the refractive index N of each lens at d-line, the Abbe number ν of each lens, and the temperature coefficient χ of each lens in Example 6.

Also, the upper part of Table 12 (follows) indicates values of focal length f, effective F number, half angle of view ω, and lateral magnification m of the whole lens system in the imaging lens in Example 6.

Further, the lower part of Table 12 indicates values respectively corresponding to expressions (1) to (4) in Example 6.

As can be seen from Table 12, all of conditional expressions (1) to (4) are satisfied in this example.

Example 7

Figure 7:
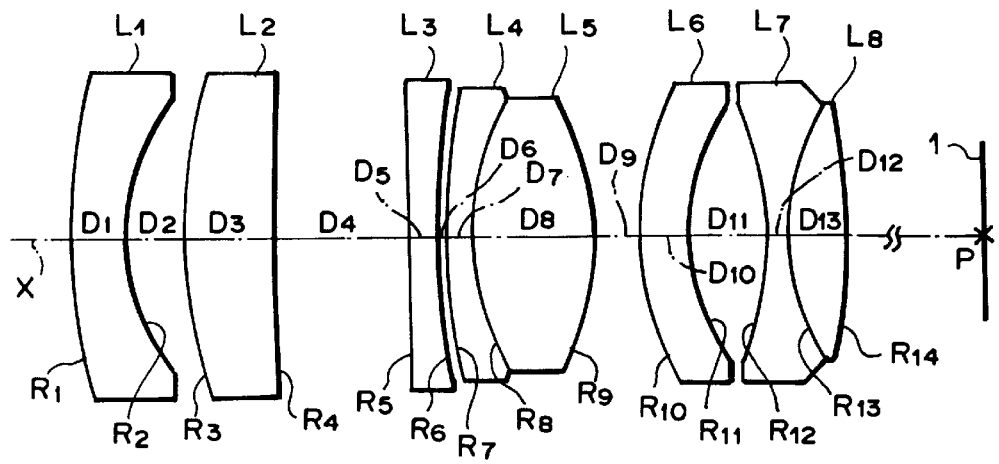
FIG. 7 is a schematic view showing a basic lens configuration in accordance with Example 7 of the present invention.

FIG. 7 shows a basic lens configuration of Example 7. Though the lens configuration in this example is substantially the same as that in Example 2, they are different from each other in that, while the third lens $L_3$ from the object side is a powerless plastic lens in Example 2, the third lens $L_3$ from the object side is a plastic lens having a slightly negative power in Example 7.

Table 13 (follows) shows the radius of curvature R (mm) of each lens surface, the center thickness of each lens or air gap between adjacent lenses D (mm), the refractive index N of each lens at d-line, the Abbe number ν of each lens, and the temperature coefficient χ of each lens in Example 7.

Also, the upper part of Table 14 (follows) indicates values of focal length f, effective F number, half angle of view ω, and lateral magnification m of the whole lens system in the imaging lens in Example 7.

Further, the lower part of Table 14 indicates values respectively corresponding to expressions (1) to (4) in Example 7.

As can be seen from Table 14, all of conditional expressions (1) to (4) are satisfied in this example.

Example 8

Figure 8:
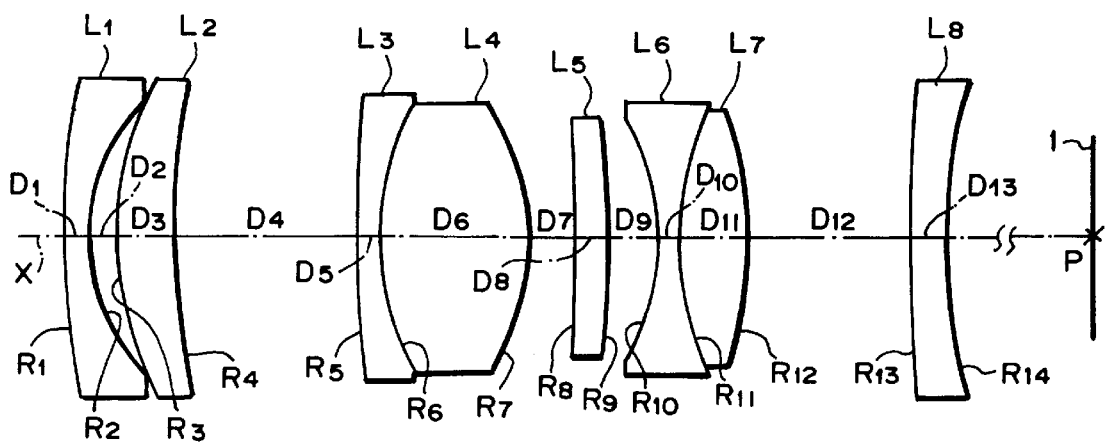
FIG. 8 is a schematic view showing a basic lens configuration in accordance with Example 8 of the present invention.
Figure 10A:
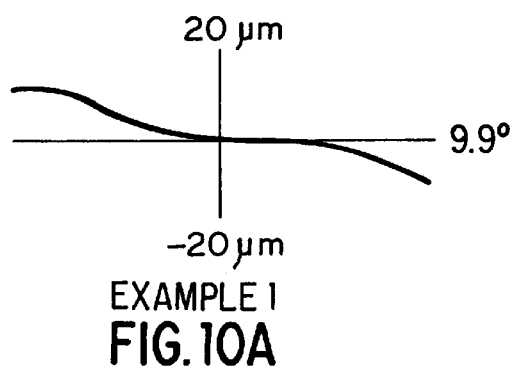
FIG. 10 is an aberration chart showing coma of the lens in accordance with Example 1.
Figure 10B:
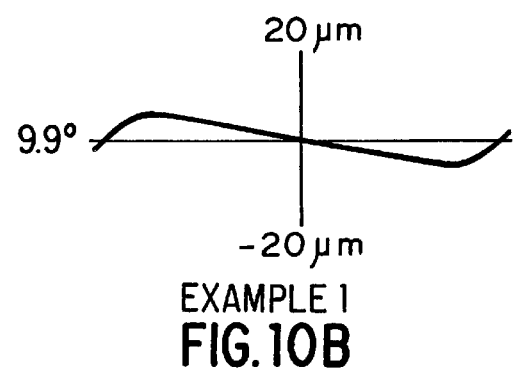
Figure 10C:
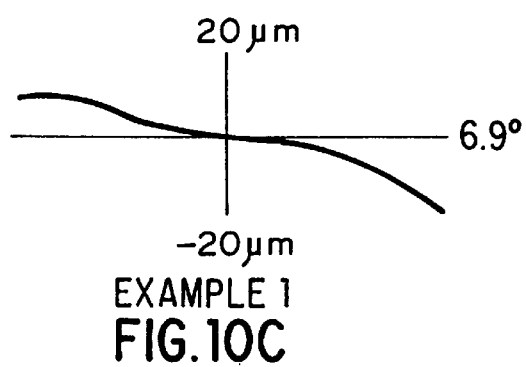
Figure 10D:
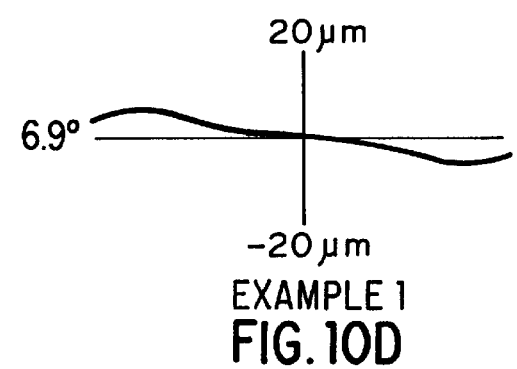
Figure 10E:
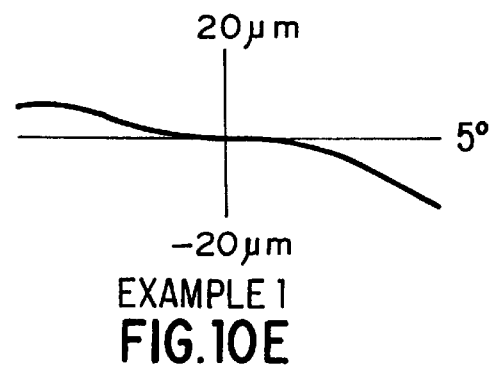
Figure 10F:
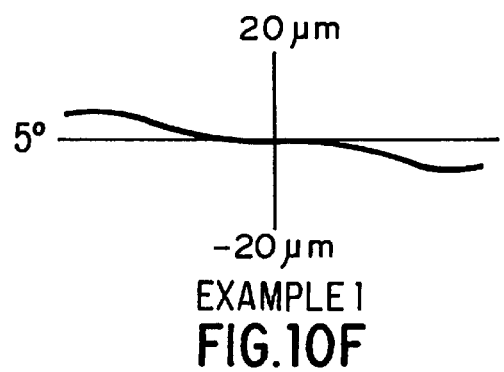
Figure 10G:
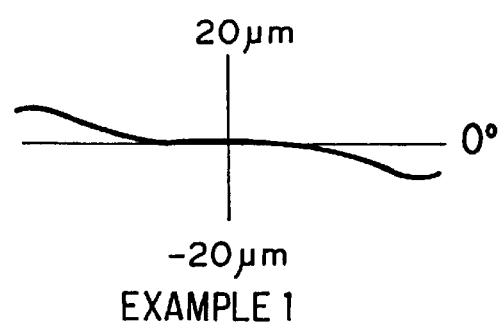
Figure 12A:
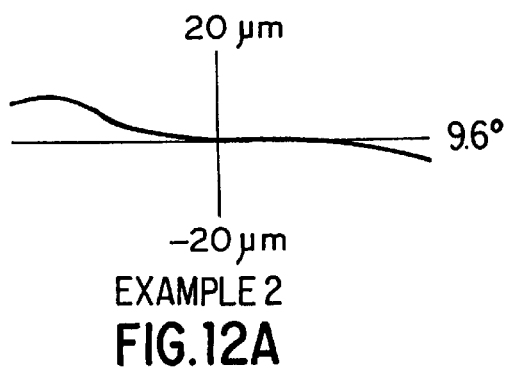
FIG. 12 is an aberration chart showing coma of the lens in accordance with Example 2.
Figure 12B:
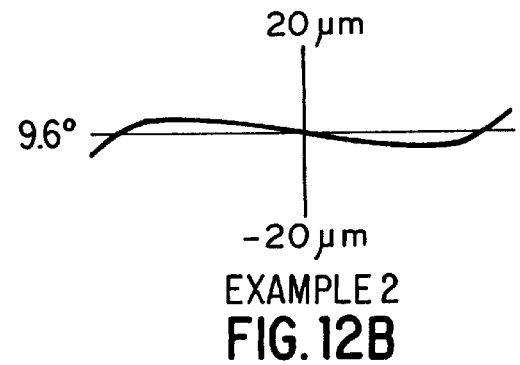
Figure 12C:
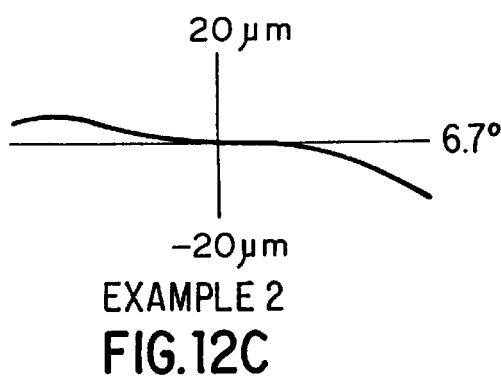
Figure 12D:
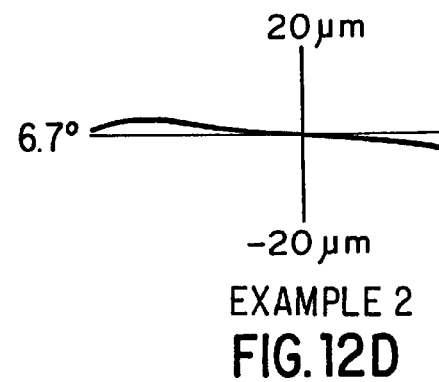
Figure 12E:
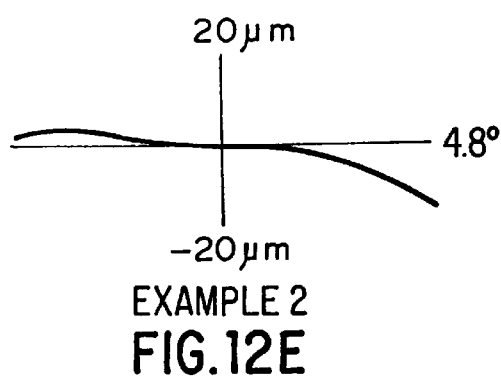
Figure 12F:
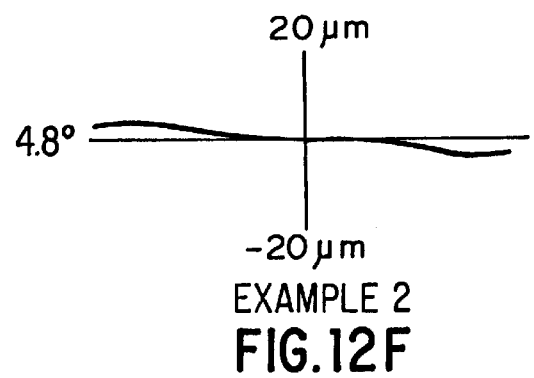
Figure 12G:
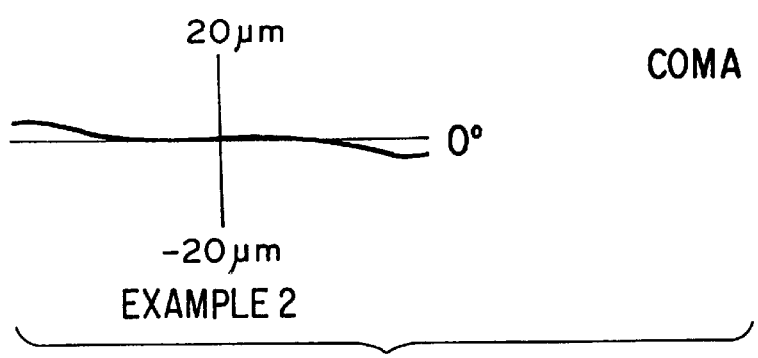
Figure 14A:
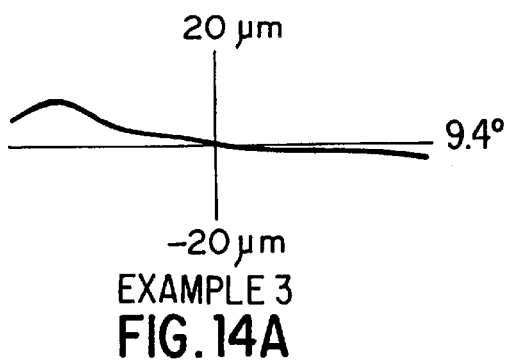
FIG. 14 is an aberration chart showing coma of the lens in accordance with Example 3.
Figure 14B:
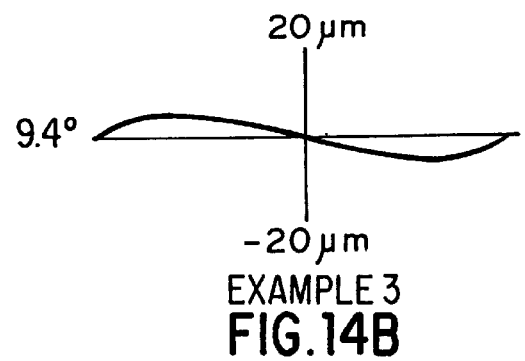
Figure 14C:
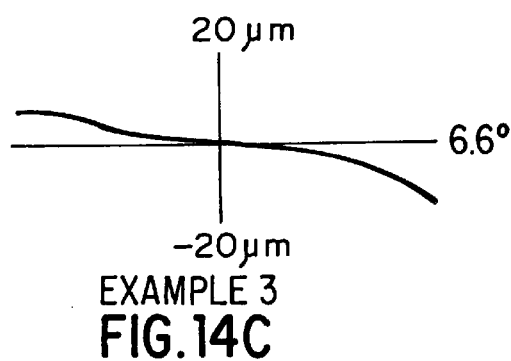
Figure 14D:
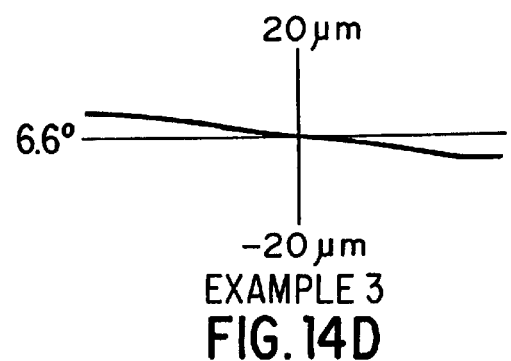
Figure 14E:
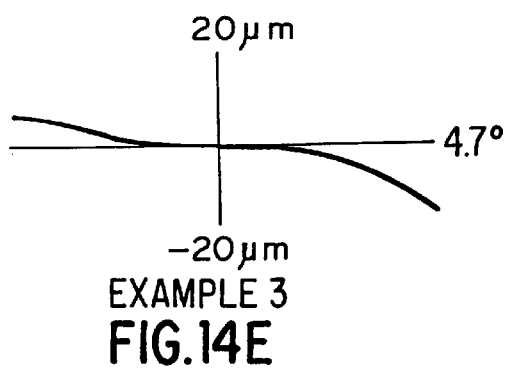
Figure 14F:
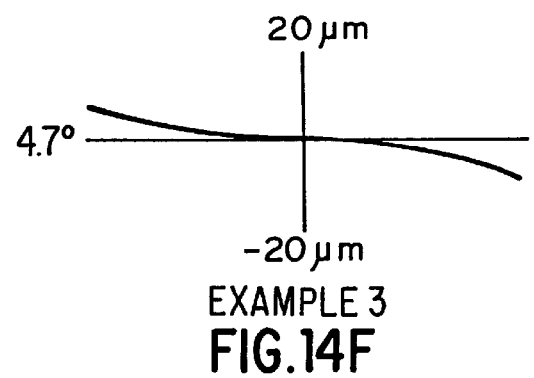
Figure 14G:
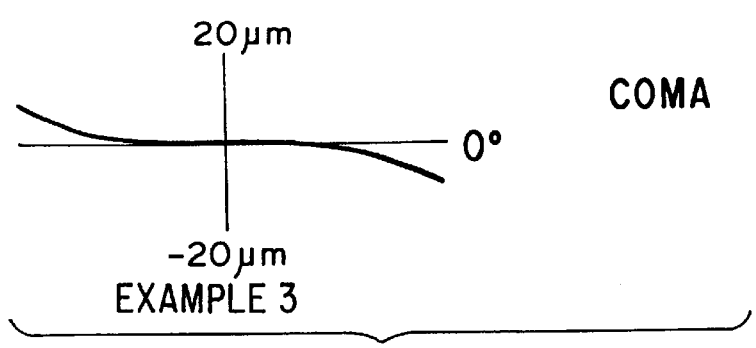
Figure 16A:
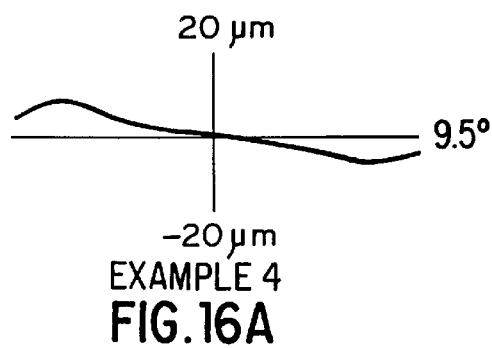
FIG. 16 is an aberration chart showing coma of the lens in accordance with Example 4.
Figure 16B:
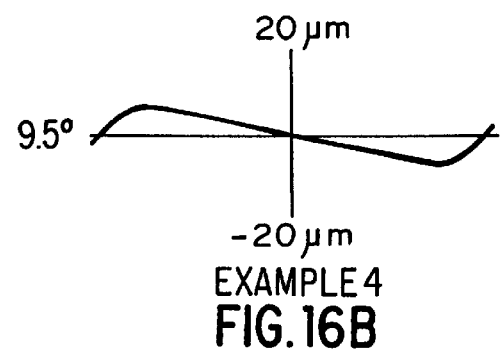
Figure 16C:
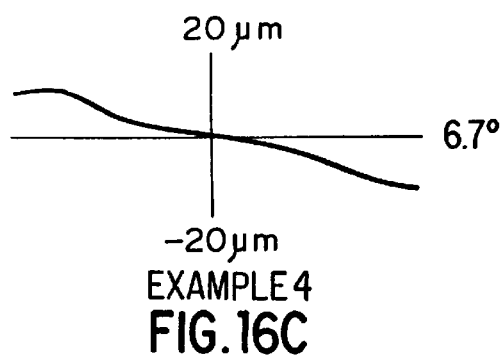
Figure 16D:
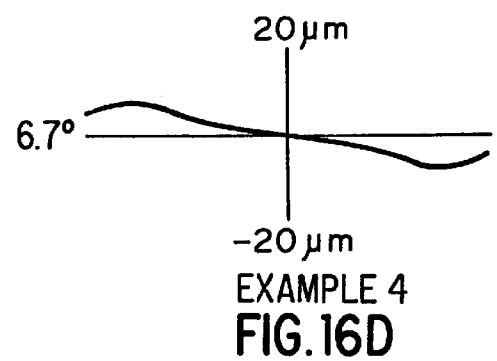
Figure 16E:
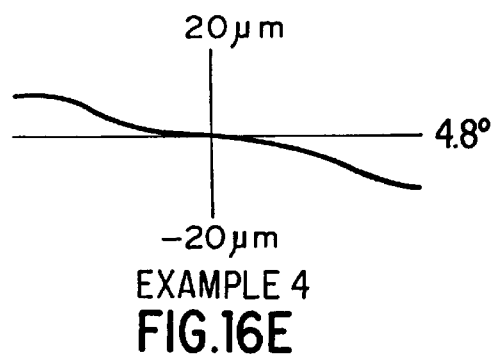
Figure 16F:
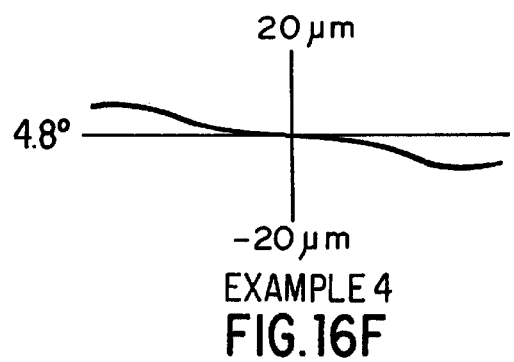
Figure 16G:
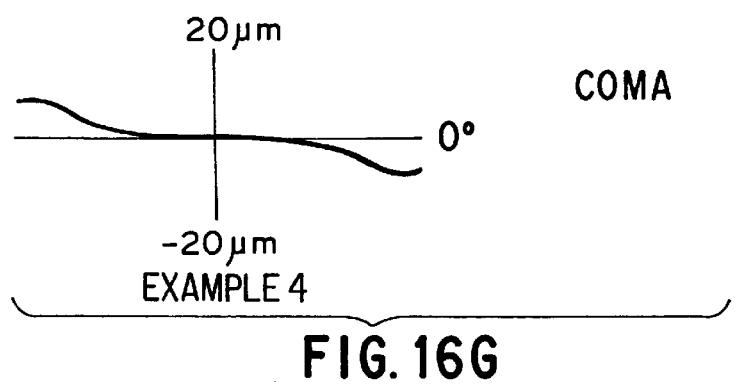
Figure 18A:
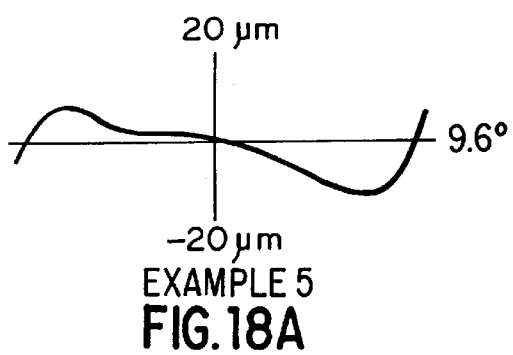
FIG. 18 is an aberration chart showing coma of the lens in accordance with Example 5.
Figure 18B:
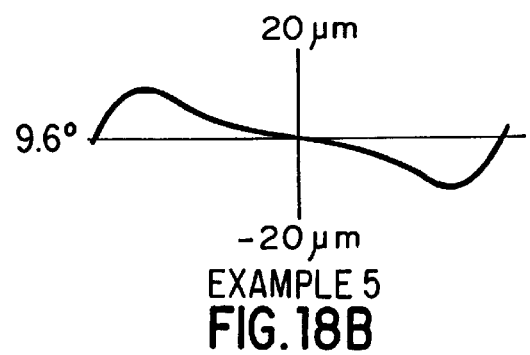
Figure 18C:
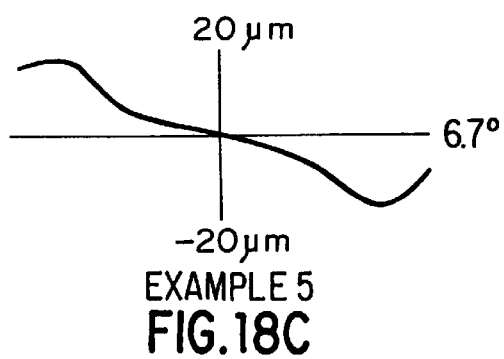
Figure 18D:
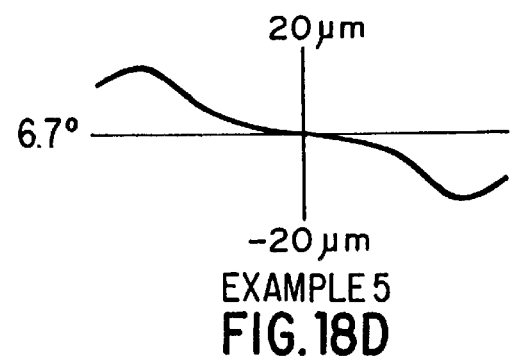
Figure 18E:
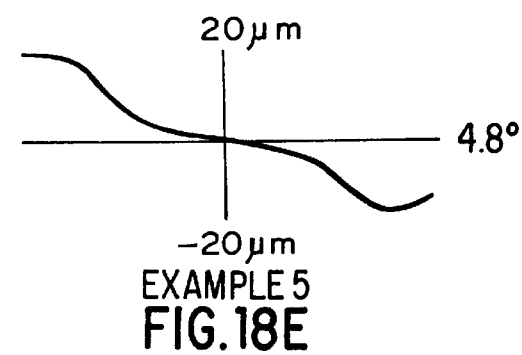
Figure 18F:
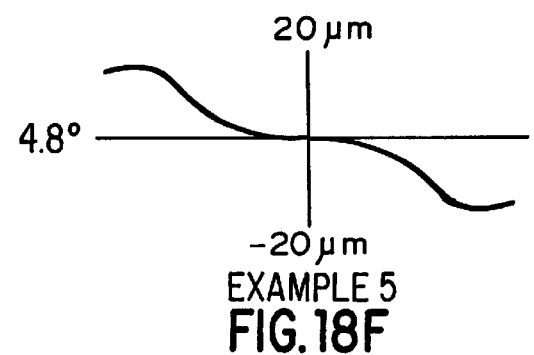
Figure 18G:
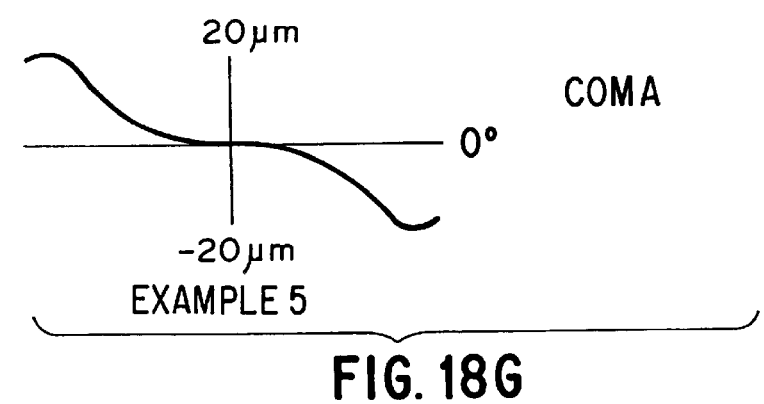
Figure 20A:
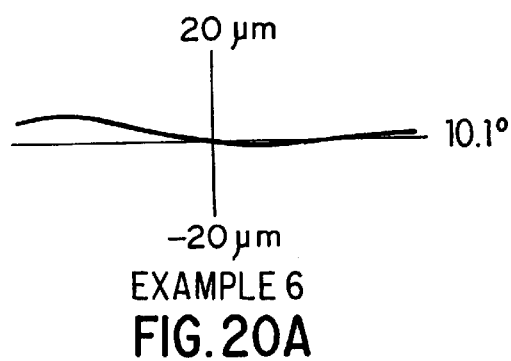
FIG. 20 is an aberration chart showing coma of the lens in accordance with Example 6.
Figure 20B:
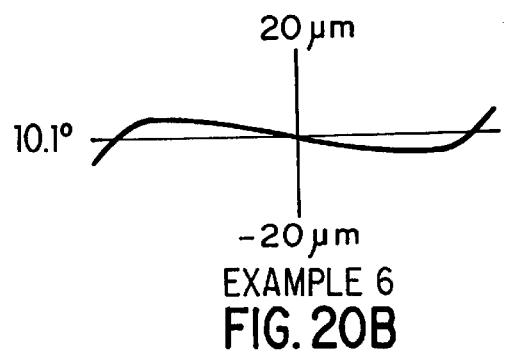
Figure 20C:
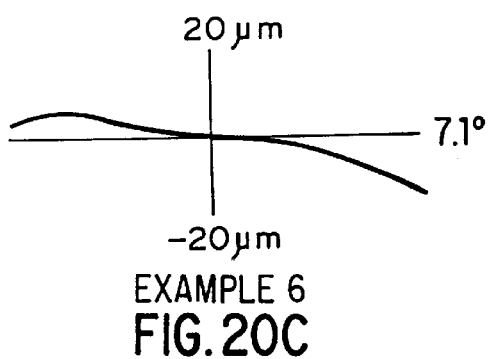
Figure 20D:
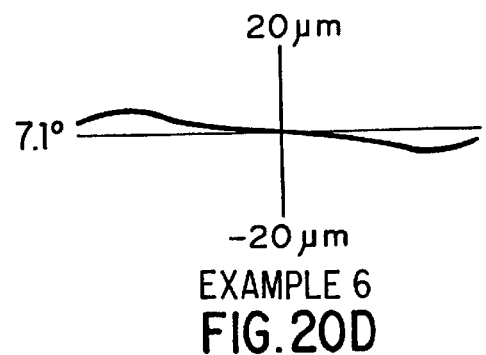
Figure 20E:
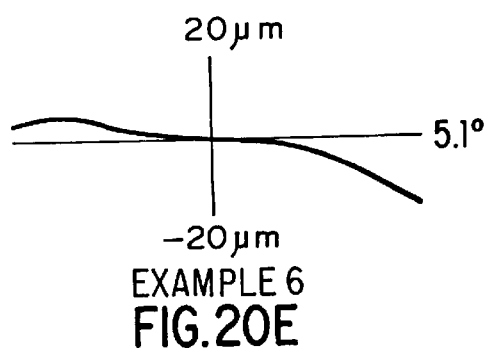
Figure 20F:
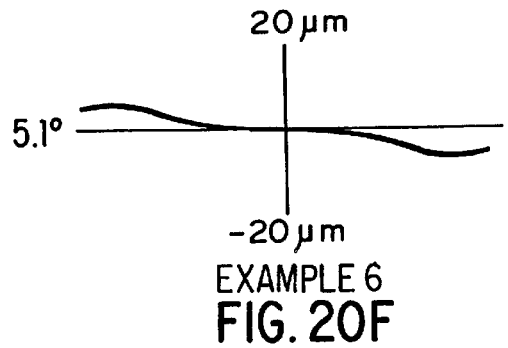
Figure 20G:
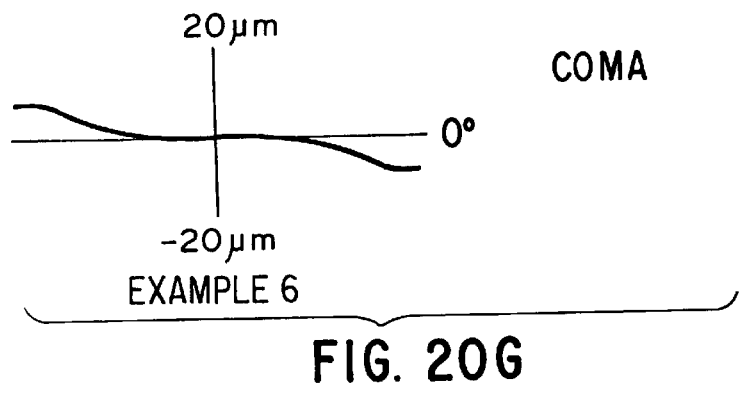
Figure 22A:
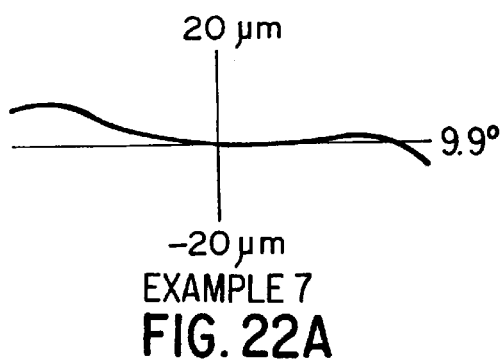
FIG. 22 is an aberration chart showing coma of the lens in accordance with Example 7.
Figure 22B:
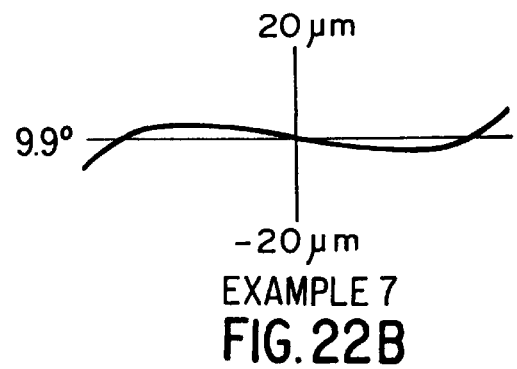
Figure 22C:
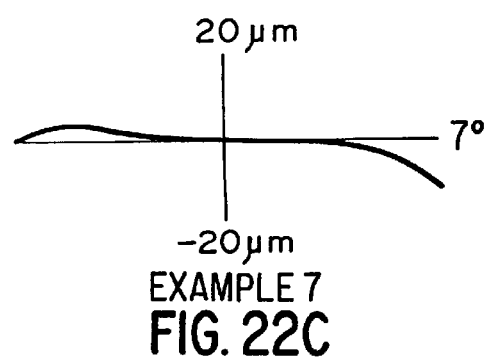
Figure 22D:
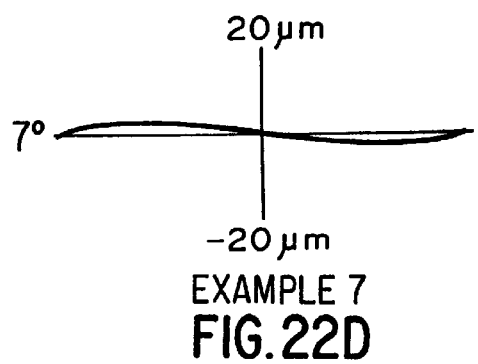
Figure 22E:
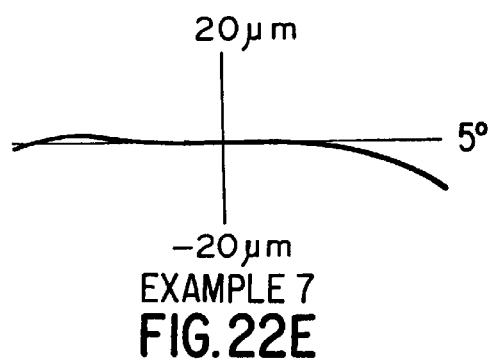
Figure 22F:
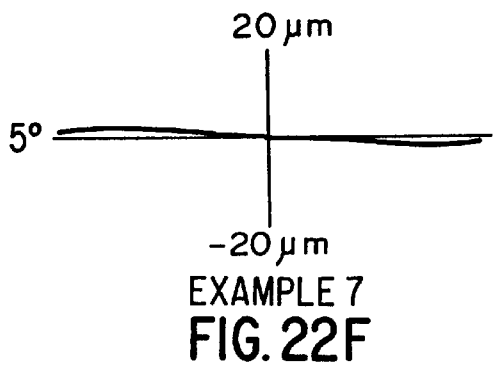
Figure 22G:
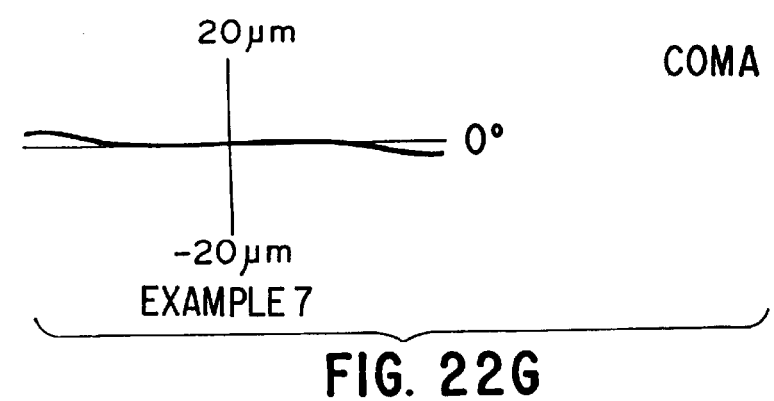
Figure 24A:
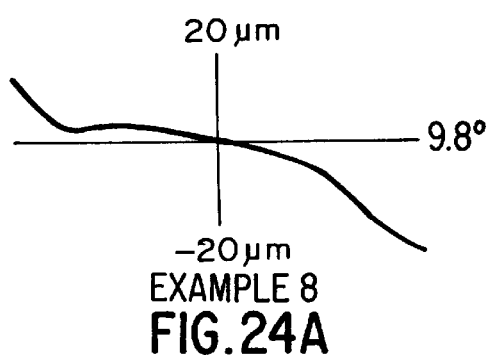
FIG. 24 is an aberration chart showing coma of the lens in accordance with Example 8.
Figure 24B:
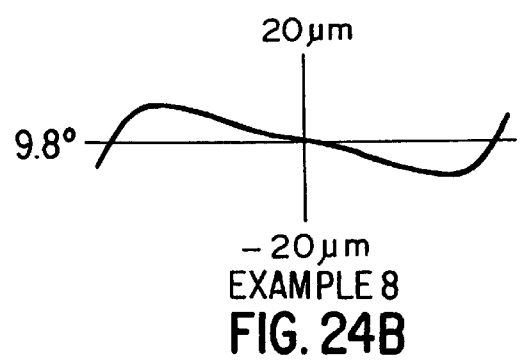
Figure 24C:
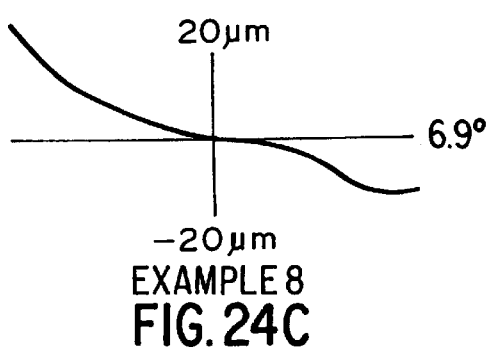
Figure 24D:
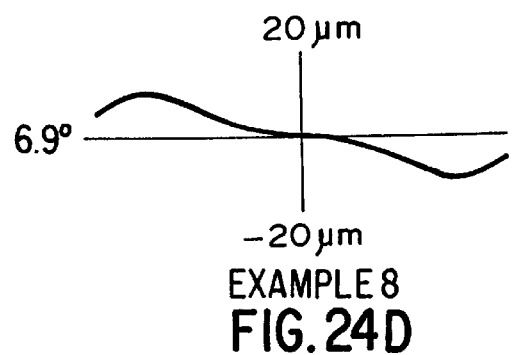
Figure 24E:
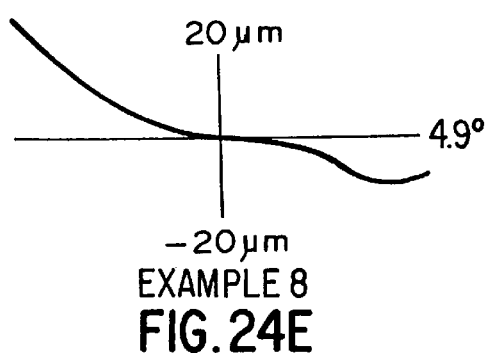
Figure 24F:
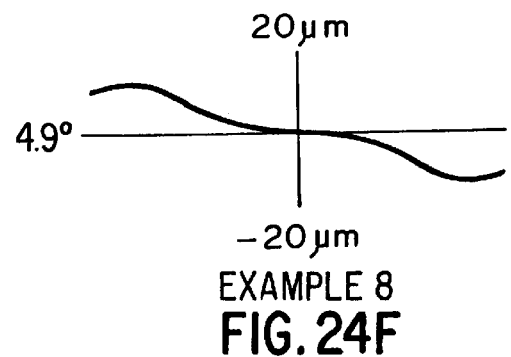
Figure 24G:
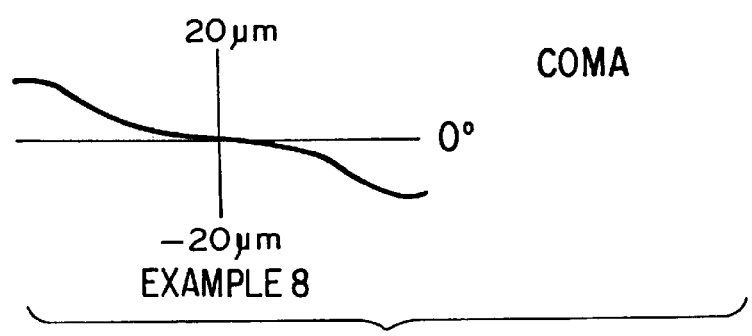

FIG. 8 shows a basic lens configuration of Example 8. Though the lens configuration in this example is substantially the same as that in Example 5, they are different from each other in that, while the fifth lens $L_5$ from the object side is a negative meniscus lens in Example 5, the fifth lens $L_5$ from the object side is a positive meniscus lens in Example 8.

Table 15 (follows) shows the radius of curvature R (mm) of each lens surface, the center thickness of each lens or air gap between adjacent lenses D (mm), the refractive index N of each lens at d-line, the Abbe number ν of each lens, and the temperature coefficient χ of each lens in Example 8.

Also, the upper part of Table 16 (follows) indicates values of focal length f, effective F number, half angle of view ω, and lateral magnification m of the whole lens system in the imaging lens in Example 8.

Further, the lower part of Table 16 indicates values respectively corresponding to expressions (1) to (4) in Example 8.

As can be seen from Table 16, all of conditional expressions (1) to (4) are satisfied in this example.

FIGS. 9 to 24 show aberration charts corresponding to Examples 1 to 8. Namely, FIGS. 9, 11, 13, 15, 17, 19, 21, and 23 show aberration charts concerning spherical aberration, astigmatism, distortion, and chromatic aberration of these examples, respectively; whereas FIGS. 10, 12, 14, 16, 18, 20, 22, and 24 show aberration charts concerning coma in these examples, respectively.

Here, each chart concerning spherical aberration shows aberrations with respect to light at wavelengths of 546 nm, 460 nm, and 690 nm. Also, each chart concerning astigmatism indicates aberrations with respect to sagittal and tangential image surfaces. Further, each chart concerning chromatic aberration indicates chromatic aberrations of light beams at wavelengths of 460 nm and 690 nm with respect to a light beam at a wavelength of 546 nm.

As can be seen from FIGS. 9 to 24, all kinds of aberration mentioned above can be made favorable in accordance with the foregoing examples.

Figure 27:
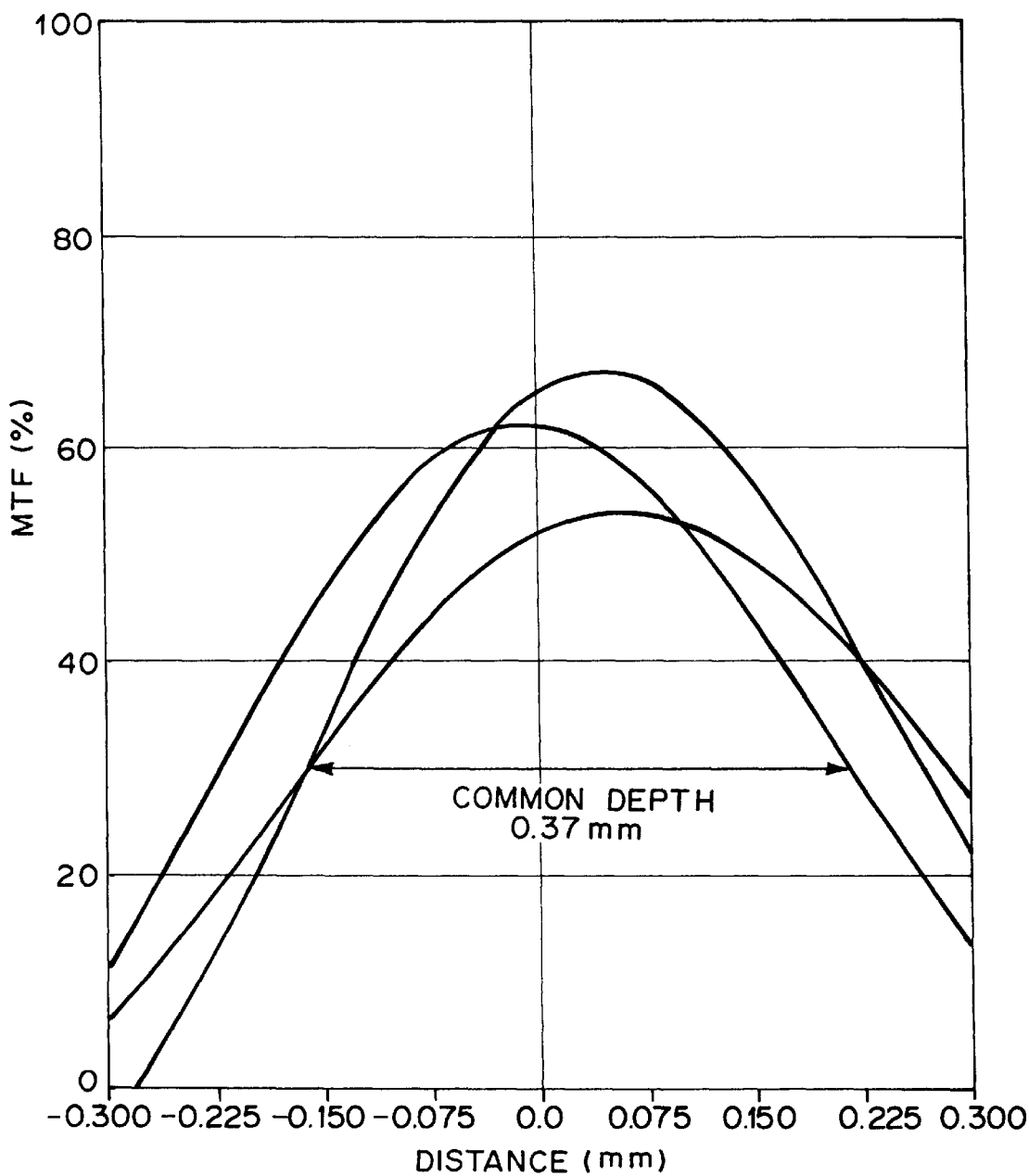
FIG. 27 is a graph showing a common depth with respect to three color light components of R, G, and B in Example 8.

FIGS. 25 to 27 respectively indicate common depths in Examples 2, 6, and 8 with respect to three color light components of R, G, and B. It can be seen from these graphs that the common depths are relatively large values, i.e., 0.31 mm, 0.36 mm, and 0.37 mm, respectively. The other examples yield common depths substantially similar thereto. Thus, in each of the foregoing examples, chromatic aberration can be made favorable.

Figure 28:
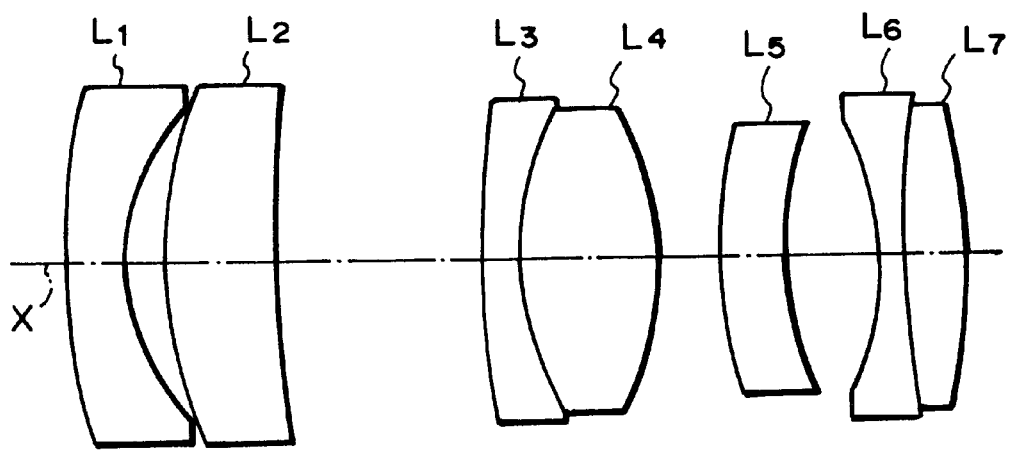
FIG. 28 is a schematic view showing a basic lens configuration in accordance with Conventional Example.

Table 17 indicates amounts of defocusing measured by the inventor concerning Conventional Example shown in FIG. 28 and Examples 2, 6, and 8 at an ordinary temperature and at a temperature raised from the ordinary temperature by 12° C. Here, the ordinary temperature is 20° C.

TABLE 17

| Conventional Example | 0.219 mm |
| --- | --- |
| Example 2 | 0.002 mm |
| Example 4 | 0.010 mm |
| Example 6 | 0.029 mm |

Also, other examples yielded values much smaller than the value in Conventional Example. It can be seen from these results that the amount of defocusing upon change in temperature can be favorably compensated for in each of the foregoing examples.

Table 18 (follows) shows the radius of curvature R (mm) of each lens surface, the center thickness of each lens or air gap between adjacent lenses D (mm), the refractive index N of each lens at d-line, the Abbe number ν of each lens, and the temperature coefficient $\chi$ of each lens in Conventional Example.

Also, the upper part of Table 19 (follows) indicates values of focal length f, effective F number, half angle of view ω, and lateral magnification m of the whole lens system in the imaging lens in Conventional Example.

Further, the lower part of Table 19 indicates the value of expression $\Sigma_i \Phi_i h_i \chi_i$ in Conventional Example.

Without being restricted to the foregoing examples, the lens in accordance with the present invention may be modified in various manners. For example, not only the number of lens sheets, the radius of curvature R of each lens, the lens gap (or lens thickness) D, the refractive index N, and the Abbe number ν, but also the value of dispersion and coefficient of linear expansion α of anomalous dispersion glass and the like can be appropriately changed.

Also, the lens of the present invention is applicable not only to the imaging lens for image readout but also to lenses for various purposes.

While the foregoing embodiments only take account of the defocusing correction upon change in parts within the lens with respect to temperature, they may be configured so as to correct defocusing generated by positional deviation of an object point or image point due to change in a member holding the lens with respect to temperature.

As explained in the foregoing, the color-corrected and temperature-compensated lens in accordance with the present invention corrects, by means of a lens made of anomalous dispersion glass, the secondary spectrum of chromatic aberration and compensates for, by means of a plastic lens having a predetermined temperature-compensating characteristic, the defocusing upon change in temperature caused by the lens made of anomalous dispersion glass, thereby satisfactorily correcting color and compensating for temperature at the same time in a simple configuration.

TABLE 1

| Surface | R | d | N | ν | $\chi$ |
| --- | --- | --- | --- | --- | --- |
| 1 | ∞ | 2.00 | 1.54608 | 56.2 | 312.20 |
| 2 | 91.43 | 0.50 | | | |
| 3 | 34.12 | 2.80 | 1.51818 | 56.5 | 0.82 |
| 4 | 13.44 | 2.12 | | | |
| 5 | 30.90 | 7.47 | 1.71615 | 53.6 | −0.27 |
| 6 | 227.96 | 8.66 | | | |
| 7 | 59.63 | 2.71 | 1.62540 | 56.8 | 2.95 |
| 8 | 17.25 | 7.97 | 1.49845 | 81.0 | 23.97 |
| 9 | −17.25 | 4.44 | | | |
| 10 | 28.88 | 2.84 | 1.61672 | 43.6 | −3.34 |
| 11 | 19.78 | 4.54 | | | |
| 12 | −17.28 | 1.11 | 1.55099 | 45.5 | 3.47 |
| 13 | 69.77 | 3.30 | 1.74794 | 44.5 | 3.50 |
| 14 | −37.07 | | | | |

TABLE 2

| Focal length | f | 68.87 |
| --- | --- | --- |
| Effective F No. | FE | 10.46 |
| Half angle of view | ω | 9.9 |
| Magnification | m | −0.693 |
| (1) $\Sigma_i \Phi_i h_i \chi_i$ | | −0.95 |
| (2) $|(\Sigma_i \Phi_i h_i \chi_i)g/(\Sigma_j \Phi_j h_j \chi_j)p|$ | | 0.96 |
| (3) $(\Sigma_i \Phi_i h_i \chi_i)ed/(\Sigma_j \Phi_j h_j \chi_j)p$ | | −0.96 |
| (4) $|(\Sigma_i \Phi_i y_i)p|$ | | 0.05 |

TABLE 3

| Surface | R | d | N | ν | $\chi$ |
| --- | --- | --- | --- | --- | --- |
| 1 | 40.20 | 3.20 | 1.51818 | 56.5 | 0.82 |
| 2 | 13.43 | 1.92 | | | |
| 3 | 29.60 | 5.09 | 1.71615 | 53.6 | −0.27 |
| 4 | 145.83 | 9.38 | | | |
| 5 | ∞ | 2.00 | 1.54608 | 56.2 | 312.20 |
| 6 | 140.02 | 1.00 | | | |
| 7 | 54.40 | 1.95 | 1.62540 | 56.8 | 2.95 |
| 8 | 17.24 | 7.55 | 1.49845 | 81.0 | 23.97 |
| 9 | −17.24 | 4.61 | | | |
| 10 | 24.95 | 2.48 | 1.61672 | 43.6 | −3.34 |
| 11 | 17.42 | 5.62 | | | |
| 12 | −17.56 | 1.36 | 1.55099 | 45.5 | 3.47 |
| 13 | 35.55 | 3.30 | 1.74794 | 44.5 | 3.50 |
| 14 | −39.27 | | | | |

TABLE 4

| Focal length | f | 69.94 |
| --- | --- | --- |
| Effective F No. | FE | 10.46 |
| Half angle of view | ω | 9.6 |
| Magnification | m | −0.693 |
| (1) $\Sigma_i \Phi_i h_i \chi_i$ | | 0.8 |
| (2) $|(\Sigma_i \Phi_i h_i \chi_i)g/(\Sigma_j \Phi_j h_j \chi_j)p|$ | | 1.11 |
| (3) $(\Sigma_i \Phi_i h_i \chi_i)ed/(\Sigma_j \Phi_j h_j \chi_j)p$ | | −1.19 |
| (4) $|(\Sigma_i \Phi_i y_i)p|$ | | 0.03 |

TABLE 5

| Surface | R | d | N | ν | $\chi$ |
| --- | --- | --- | --- | --- | --- |
| 1 | 33.42 | 3.20 | 1.51818 | 56.5 | 0.82 |
| 2 | 13.07 | 2.21 | | | |
| 3 | 26.55 | 6.50 | 1.71615 | 53.6 | −0.27 |
| 4 | 100.24 | 9.12 | | | |
| 5 | 62.10 | 2.71 | 1.62540 | 56.8 | 2.95 |
| 6 | 16.74 | 7.25 | 1.49845 | 81.0 | 23.97 |

TABLE 5-continued

| Surface | R | d | N | ν | χ |
|---|---|---|---|---|---|
| 7 | −16.74 | 0.30 | | | |
| 8 | ∞ | 2.00 | 1.54608 | 56.2 | 312.20 |
| 9 | 146.61 | 2.80 | | | |
| 10 | 21.74 | 1.85 | 1.61672 | 43.6 | −3.34 |
| 11 | 16.41 | 6.28 | | | |
| 12 | −16.53 | 1.36 | 1.55099 | 45.5 | 3.47 |
| 13 | 37.18 | 3.50 | 1.74794 | 44.5 | 3.50 |
| 14 | −35.61 | | | | |

TABLE 6

| Focal length | f | 69.75 |
|---|---|---|
| Effective F No. | FE | 10.46 |
| Half angle of view | ω | 9.4 |
| Magnification | m | −0.693 |
| (1) Σ i Φ i h i χ i | | 1.12 |
| (2) \| (Σ i Φ i h i χ i)g/(Σ j Φ j h j χ j)p \| | | 1.17 |
| (3) (Σ i Φ i h i χ i)ed/(Σ j Φ j h j χ j)p | | −1.25 |
| (4) \| (Σ i Φ i y i)p \| | | 0.02 |

TABLE 7

| Surface | R | d | N | ν | χ |
|---|---|---|---|---|---|
| 1 | 40.20 | 1.50 | 1.51818 | 56.5 | 0.82 |
| 2 | 13.44 | 1.88 | | | |
| 3 | 34.54 | 6.00 | 1.71615 | 53.6 | −0.27 |
| 4 | 1034.87 | 10.95 | | | |
| 5 | 68.64 | 1.41 | 1.62540 | 56.8 | 2.95 |
| 6 | 17.23 | 7.55 | 1.49845 | 81.0 | 23.97 |
| 7 | −17.23 | 3.50 | | | |
| 8 | 24.51 | 2.00 | 1.61672 | 43.6 | −3.34 |
| 9 | 17.21 | 7.22 | | | |
| 10 | −18.47 | 1.36 | 1.55099 | 45.5 | 3.47 |
| 11 | 36.97 | 3.30 | 1.74794 | 44.5 | 3.50 |
| 12 | −35.01 | 0.30 | | | |
| 13 | ∞ | 2.00 | 1.54608 | 56.2 | 312.20 |
| 14 | 95.49 | | | | |

TABLE 8

| Focal length | f | 69.48 |
|---|---|---|
| Effective F No. | FE | 10.46 |
| Half angle of view | ω | 9.5 |
| Magnification | m | −0.693 |
| (1) Σ i Φ i h i χ i | | −0.51 |
| (2) \| (Σ i Φ i h i χ i)g/(Σ j Φ j h j χ j)p \| | | 0.94 |
| (3) (Σ i Φ i h i χ i)ed/(Σ j Φ j h j χ j)p | | −1.00 |
| (4) \| (Σ i Φ i y i)p \| | | 0.04 |

TABLE 9

| Surface | R | d | N | ν | χ |
|---|---|---|---|---|---|
| 1 | 40.10 | 1.50 | 1.51818 | 56.5 | 0.82 |
| 2 | 13.40 | 2.00 | | | |
| 3 | 39.79 | 6.00 | 1.71615 | 53.6 | −0.27 |
| 4 | −437.51 | 11.57 | | | |
| 5 | 93.35 | 1.41 | 1.62540 | 56.8 | 2.95 |
| 6 | 17.05 | 7.55 | 1.49845 | 81.0 | 23.97 |
| 7 | −17.05 | 3.50 | | | |
| 8 | 23.52 | 2.00 | 1.61672 | 43.6 | −3.34 |
| 9 | 16.71 | 7.47 | | | |
| 10 | −21.55 | 1.36 | 1.55099 | 45.5 | 3.47 |
| 11 | 29.37 | 3.60 | 1.74794 | 44.5 | 3.50 |
| 12 | −40.20 | 10.00 | | | |

TABLE 9-continued

| Surface | R | d | N | ν | χ |
|---|---|---|---|---|---|
| 13 | ∞ | 2.00 | 1.54608 | 56.2 | 312.20 |
| 14 | 79.47 | | | | |

TABLE 10

| Focal length | f | 68.65 |
|---|---|---|
| Effective F No. | FE | 10.46 |
| Half angle of view | ω | 9.6 |
| Magnification | m | −0.693 |
| (1) Σ i Φ i h i χ i | | −0.88 |
| (2) \| (Σ i Φ i h i χ i)g/(Σ j Φ j h j χ j)p \| | | 0.9 |
| (3) (Σ i Φ i h i χ i)ed/(Σ j Φ j h j χ j)p | | −0.96 |
| (4) \| (Σ i Φ i y i)p \| | | 0.06 |

TABLE 11

| Surface | R | d | N | ν | χ |
|---|---|---|---|---|---|
| 1 | 1000.00 | 2.00 | 1.54608 | 56.2 | 312.20 |
| 2 | 62.93 | 2.00 | | | |
| 3 | 40.00 | 1.50 | 1.51818 | 56.5 | 0.82 |
| 4 | 13.90 | 2.69 | | | |
| 5 | 29.23 | 6.00 | 1.71615 | 53.6 | −0.27 |
| 6 | 2297.58 | 9.72 | | | |
| 7 | 79.33 | 2.01 | 1.62540 | 56.8 | 2.95 |
| 8 | 17.31 | 7.55 | 1.49845 | 81.0 | 23.97 |
| 9 | −17.31 | 2.75 | | | |
| 10 | 23.51 | 3.46 | 1.61672 | 43.6 | −3.34 |
| 11 | 17.45 | 3.00 | | | |
| 12 | −17.57 | 1.36 | 1.51200 | 63.4 | 1.53 |
| 13 | 28.08 | 3.50 | 1.57098 | 70.9 | 31.87 |
| 14 | −32.94 | | | | |

TABLE 12

| Focal length | f | 68.74 |
|---|---|---|
| Effective F No. | FE | 10.46 |
| Half angle of view | ω | 10.1 |
| Magnification | m | −0.693 |
| (1) Σ i Φ i h i χ i | | 2.2 |
| (2) \| (Σ i Φ i h i χ i)g/(Σ j Φ j h j χ j)p \| | | 1.19 |
| (3) (Σ i Φ i h i χ i)ed/(Σ j Φ j h j χ j)p | | −1.26 |
| (4) \| (Σ i Φ i y i)p \| | | 0.07 |

TABLE 13

| Surface | R | d | N | ν | χ |
|---|---|---|---|---|---|
| 1 | 40.30 | 3.20 | 1.51818 | 56.5 | 0.82 |
| 2 | 13.27 | 3.73 | | | |
| 3 | 31.93 | 5.39 | 1.71615 | 53.6 | −0.27 |
| 4 | 207.38 | 8.27 | | | |
| 5 | ∞ | 2.00 | 1.54608 | 56.2 | 312.20 |
| 6 | 76.14 | 0.50 | | | |
| 7 | 52.20 | 1.41 | 1.62540 | 56.8 | 2.95 |
| 8 | 17.35 | 7.55 | 1.49845 | 81.0 | 23.97 |
| 9 | −17.35 | 2.75 | | | |
| 10 | 19.06 | 2.89 | 1.51825 | 63.9 | 1.78 |
| 11 | 14.34 | 4.78 | | | |
| 12 | −19.98 | 1.35 | 1.51200 | 63.4 | 1.53 |
| 13 | 16.22 | 3.51 | 1.57098 | 70.9 | 31.87 |
| 14 | −35.77 | | | | |

TABLE 14

| | | |
|---|---|---|
| Focal length | f | 69.28 |
| Effective F No. | FE | 10.46 |
| Half angle of view | ω | 9.9 |
| Magnification | m | −0.693 |

| | |
|---|---|
| (1) Σ i Φ i h i χ i | 2.65 |
| (2) \| (Σ i Φ i h i χ i)g/(Σ j Φ j h j χ j)p \| | 1.20 |
| (3) (Σ i Φ i h i χ i)ed/(Σ j Φ j h j χ j)p | −1.29 |
| (4) \| (Σ i Φ i y i)p \| | 0.05 |

TABLE 15

| Surface | R | d | N | ν | χ |
|---|---|---|---|---|---|
| 1 | 57.40 | 1.50 | 1.51818 | 56.5 | 0.82 |
| 2 | 12.48 | 1.62 | | | |
| 3 | 19.75 | 3.50 | 1.71615 | 53.6 | −0.27 |
| 4 | 46.22 | 11.38 | | | |
| 5 | 92.95 | 1.41 | 1.62540 | 56.8 | 2.95 |
| 6 | 18.43 | 9.13 | 1.49845 | 81.0 | 23.97 |
| 7 | −15.94 | 2.75 | | | |
| 8 | −146.20 | 2.00 | 1.61672 | 43.6 | −3.34 |
| 9 | −83.27 | 3.00 | | | |
| 10 | −15.83 | 1.35 | 1.51200 | 63.4 | 1.53 |
| 11 | 21.61 | 4.21 | 1.57098 | 70.9 | 31.87 |
| 12 | −25.62 | 10.00 | | | |
| 13 | 219.88 | 2.00 | 1.54608 | 56.2 | 312.20 |
| 14 | 37.88 | | | | |

TABLE 16

| | | |
|---|---|---|
| Focal length | f | 68.51 |
| Effective F No. | FE | 10.46 |
| Half angle of view | ω | 9.8 |
| Magnification | m | −0.693 |

| | |
|---|---|
| (1) Σ i Φ i h i χ i | −0.58 |
| (2) \| (Σ i Φ i h i χ i)g/(Σ j Φ j h j χ j)p \| | 0.97 |
| (3) (Σ i Φ i h i χ i)ed/(Σ j Φ j h j χ j)p | −1.04 |
| (4) \| (Σ i Φ i y i)p \| | 0.09 |

TABLE 18

| Surface | R | d | N | ν | χ |
|---|---|---|---|---|---|
| 1 | 40.29 | 3.20 | 1.51818 | 56.5 | 0.82 |
| 2 | 13.40 | 2.18 | | | |
| 3 | 26.61 | 6.00 | 1.71615 | 53.6 | −0.27 |
| 4 | 79.12 | 11.30 | | | |
| 5 | 68.38 | 2.01 | 1.62540 | 56.8 | 2.95 |
| 6 | 17.36 | 7.55 | 1.49845 | 81.0 | 23.97 |
| 7 | −17.36 | 3.50 | | | |
| 8 | 29.50 | 3.44 | 1.61672 | 43.6 | −3.34 |
| 9 | 20.54 | 5.12 | | | |
| 10 | −17.25 | 1.36 | 1.55098 | 45.5 | 3.47 |
| 11 | 57.85 | 3.30 | 1.74794 | 44.5 | 3.50 |
| 12 | −38.10 | | | | |

TABLE 19

| | | |
|---|---|---|
| Focal length | f | 69.56 |
| Effective F No. | FE | 10.46 |
| Half angle of view | ω | 9.6 |
| Magnification | m | −0.693 |

| | |
|---|---|
| (1) Σ i Φ i h i χ i | 7.64 |

What is claimed is:

1. A color-corrected and temperature-compensated lens comprising a lens system including a lens made of anomalous dispersion glass for correcting a secondary spectrum of axial chromatic aberration and a plastic lens having a temperature-compensating characteristic for correcting defocusing upon change of said lens system with respect to temperature; wherein said lens satisfies the following conditional expression (3):

$$[-1.2 < \Sigma_i \Phi_i h_i \chi_i < 3.0 \tag{1}$$

$$|(\Sigma_i \Phi_i h_i \chi_i)g / (\Sigma_j \Phi_j h_j \chi_j)p| < 1.3] \tag{2}$$

$$-1.5 < (\Sigma_i \Phi_i h_i \chi_i)ed / (\Sigma_j \Phi_j h_j \chi_j)p < -0.7 \tag{3}$$

wherein $\Phi_i$ is a refracting power of each lens;

$h_i$ is a height of a ray passing through each lens when each lens is substituted by a thin lens and subjected to ray tracing with respect to a center luminous flux thereof;

$\chi_i$ is a coefficient determined by:

$$\chi = \alpha - dn/dt \cdot 1/(n-1)$$

where a coefficient of linear expansion of a material is α, a refractive index thereof is N, and change in refractive index thereof with respect to change in temperature is dn/dt; and suffixes p, and ed respectively refer to a plastic lens, and an anomalous dispersion lens having a level of dispersion ν=60 or higher and a temperature coefficient χ=9.0 or higher.

2. A color-corrected and temperature-compensated lens according to claim 1, further satisfying the following conditional expression (4):

$$|(\Sigma_i \Phi_i y_i)p| < 0.11 \tag{4}$$

wherein $y_i$ is a maximum value among heights at which all of rays passing through said lens system are transmitted through the plastic lens.

* * * * *

UNITED STATES PATENT AND TRADEMARK OFFICE
CERTIFICATE OF CORRECTION

PATENT NO. : 6,081,384   Page 1 of 1
DATED : June 27, 2000
INVENTOR(S) : Masao Mori It is certified that error appears in the above-identified patent and that said Letters Patent is hereby corrected as shown below:

Column 14,
Line 23, delete  "[-1.2 < $\Sigma_i \Phi_i h_i \chi_i$ < 3.0           (1)"
Line 25, delete  "|($\Sigma_i \Phi_i h_i \chi_i$)g/($\Sigma_j \Phi_j h_j \chi_j$)p| < 1.3 (2)]"

Line 46, delete Claim 2 and substitute therefore:
-- 2. A color-corrected and temperature-compensated lens according to claim 1, wherein said lens satisfies the following conditional expressions (1) and (2):

$$-1.2 < \Sigma_i \Phi_i h_i \chi_i < 3.0 \quad\quad (1)$$
$$|(\Sigma_i \Phi_i h_i \chi_i)g/(\Sigma_j \Phi_j h_j \chi_j)p| < 1.3 \quad\quad (2)$$

wherein suffix g refers to a glass lens. --
Line 55, insert claim 3:
-- 3. A color-corrected and temperature-compensated lens according to claim 2, further satisfying the following conditional expression (4):

$$|(\Sigma_i \Phi_i y_i)p| < 0.11 \quad\quad (4)$$

wherein $y_i$ is a maximum value among heights at which all of rays passing through said lens system are transmitted through the plastic lens. --

Signed and Sealed this

Seventeenth Day of September, 2002

Attest:

Attesting Officer

JAMES E. ROGAN
*Director of the United States Patent and Trademark Office*